(12) United States Patent
Jang et al.

(10) Patent No.: US 9,952,791 B2
(45) Date of Patent: Apr. 24, 2018

(54) MEMORY CARDS AND INTERFACE CIRCUITS TO COMMUNICATE WITH MEMORY CARDS

(71) Applicants: Soonbok Jang, Seoul (KR); Sungho Seo, Seoul (KR); Sang-Hoon Lee, Yongin-si (KR)

(72) Inventors: Soonbok Jang, Seoul (KR); Sungho Seo, Seoul (KR); Sang-Hoon Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 794 days.

(21) Appl. No.: 14/454,268

(22) Filed: Aug. 7, 2014

(65) Prior Publication Data

US 2015/0160880 A1 Jun. 11, 2015

Related U.S. Application Data

(60) Provisional application No. 61/912,729, filed on Dec. 6, 2013.

(30) Foreign Application Priority Data

Feb. 27, 2014 (KR) ........................ 10-2014-0023276

(51) Int. Cl.
*G06F 3/00* (2006.01)
*G06F 3/06* (2006.01)
(52) U.S. Cl.
CPC .......... *G06F 3/0625* (2013.01); *G06F 3/0659* (2013.01); *G06F 3/0679* (2013.01); *Y02B 60/1246* (2013.01)

(58) Field of Classification Search
None
See application file for complete search history.

(56) References Cited

U.S. PATENT DOCUMENTS

| 5,655,092 | A | * | 8/1997 | Ojala | .................. | G06F 13/4072 |
| | | | | | | 710/300 |
| 6,052,742 | A | * | 4/2000 | Kirinaka | ................ | G11C 5/143 |
| | | | | | | 326/80 |
| 6,308,230 | B1 | | 10/2001 | Potter et al. | | |
| 6,378,026 | B1 | | 4/2002 | Chan et al. | | |

(Continued)

FOREIGN PATENT DOCUMENTS

| KR | 20060018490 A | 3/2006 |
| KR | 20060090283 A | 8/2006 |

(Continued)

*Primary Examiner* — Elias Mamo
(74) *Attorney, Agent, or Firm* — Harness, Dickey & Pierce, P.L.C.

(57) ABSTRACT

A memory card includes a first signal terminal configured to output a first signal; a second signal terminal configured to output a second signal, the first and second signals being complementary to each other; and a controller configured to drive the first and second signal terminals to have a negative state until a link connection is performed after power is supplied to the memory card. When a level of the first signal is greater than a level of the second signal, the first and second signal terminals are in a positive state, whereas when a level of the first signal is smaller than a level of the second signal, the first and second signal terminals are in the negative state.

20 Claims, 18 Drawing Sheets

(56) References Cited

U.S. PATENT DOCUMENTS

| | | | |
|---|---|---|---|
| 6,766,401 B2* | 7/2004 | Bonomo | G06F 11/2247 710/15 |
| 7,292,946 B2* | 11/2007 | Huang | G06F 13/4081 702/64 |
| 8,271,714 B2 | 9/2012 | Ede | |
| 8,615,611 B2 | 12/2013 | Hall | |
| 8,667,203 B2 | 3/2014 | Kobayashi | |
| 9,558,135 B2* | 1/2017 | Jones | G06F 13/38 |
| 2005/0114580 A1 | 5/2005 | Ede | |
| 2005/0134321 A1 | 6/2005 | Ede | |
| 2006/0046788 A1 | 3/2006 | Oh | |
| 2009/0276546 A1* | 11/2009 | Lui | G06F 13/4072 710/16 |
| 2012/0117284 A1 | 5/2012 | Southcombe et al. | |
| 2013/0262720 A1 | 10/2013 | Kobayashi | |
| 2013/0275629 A1 | 10/2013 | Hall | |

FOREIGN PATENT DOCUMENTS

| | | |
|---|---|---|
| KR | 20100039666 A | 4/2010 |
| KR | 20110109518 A | 10/2011 |
| KR | 20120010330 A | 2/2012 |

\* cited by examiner

MEMORY CARDS AND INTERFACE CIRCUITS TO COMMUNICATE WITH MEMORY CARDS

CROSS-REFERENCE TO RELATED APPLICATIONS

This application claims priority under 35 U.S.C. § 119 to U.S. provisional patent application No. 61/912,729, filed on Dec. 6, 2013, and Korean Patent Application No. 10-2014-0023276 filed Feb. 27, 2014, in the Korean Intellectual Property Office, the entire contents of each of which are hereby incorporated by reference.

BACKGROUND

Field

Example embodiments of inventive concepts described herein relate to semiconductor circuits, and more particularly, memory cards and/or interface circuits configured to communicate with memory cards.

Description of Conventional Art

A conventional semiconductor memory device may be fabricated using semiconductors such as silicon (Si), germanium (Ge), gallium arsenide (GaAs), indium phosphide (InP), and the like. Semiconductor memory devices are classified as volatile memory devices and nonvolatile memory devices.

Volatile memory devices lose contents stored therein at power-off. Example volatile memory devices include static RAM (SRAM), dynamic RAM (DRAM), synchronous DRAM (SDRAM), etc. Nonvolatile memory devices retain stored contents even at power-off. Example nonvolatile memory devices include read only memory (ROM), programmable ROM (PROM), electrically programmable ROM (EPROM), electrically erasable and programmable ROM (EEPROM), flash memory devices, phase-change RAM (PRAM), magnetic RAM (MRAM), resistive RAM (RRAM), ferroelectric RAM (FRAM), etc.

A nonvolatile memory may be used as a storage of a computing device. A nonvolatile memory may also be used as a solid state drive (SSD) that is used together with a computer device, an embedded storage that is used together with a mobile device, a detachable memory card that is configured to be attached to or detached from the computer device or the mobile device.

SUMMARY

At least one example embodiment of inventive concepts provides a memory card. According to at least this example embodiment, the memory card includes: a first signal terminal configured to output a first signal; a second signal terminal configured to output a second signal, the first and second signals being complementary to each other; and a controller configured to drive the first and second signal terminals to a first negative state until a link connection is performed after power is supplied to the memory card. When a level of the first signal is greater than a level of the second signal, the first and second signal terminals are in a positive state. When a level of the first signal is smaller than a level of the second signal, the first and second signal terminals are in the first negative state.

The memory card may further include: a third signal terminal configured to receive a third signal; and a fourth signal terminal configured to receive a fourth signal, the third and fourth signals being complementary to each other. When power is supplied, the controller is configured to drive the third and fourth signal terminals to a ground level.

The controller may be configured to detect a second negative state where a level of the third signal is smaller than a level of the fourth signal. When the second negative state is detected, the controller may be configured to perform the link connection using the first to fourth signal terminals.

The positive state may correspond to a first bit, and the first negative state may correspond to a second bit. When performing the link connection, the controller may transmit data through the first and second signal terminals. The controller may be configured to transmit the data using the positive state and the first negative state.

The controller may be configured to drive the first and second signal terminals with the first negative state to notify a host that the memory card is connected to the host.

After performing a power-on reset operation, the controller may be configured to drive the first and second signal terminals to have the first negative state.

A voltage difference between the second signal and the first signal in the first negative state may range from about 200 mV to about 400 mV, inclusive.

At least one other example embodiment provides an interface circuit configured to communicate with a memory card. According to at least this example embodiment, the interface circuit includes: a first signal terminal configured to receive a first signal; a second signal terminal configured to receive a second signal, the first and second signals being complementary to each other; and a controller configured to drive the first and second signal terminals to a ground state when the memory card is not connected. The controller is further configured to detect whether or not the memory card is connected based on the first and second signals received through the first and second signal terminals.

At least one other example embodiment provides an interface circuit configured to communicate with a memory card. According to at least this example embodiment, the interface circuit includes: a first signal terminal configured to receive a first signal; a second signal terminal configured to receive a second signal, the first and second signals being complementary to each other; and a controller configured to detect whether or not the memory card is connected based on the first and second signals received through the first and second signal terminals, and to drive the first and second signal terminals to a ground state when the memory card is not connected.

The first and second signal terminals may have a positive state when a level of the first signal is greater than a level of the second signal. The first and second signal terminals may have a negative state when a level of the first signal is smaller than a level of the second signal. The controller may be configured to detect that the memory card is connected when the first and second signal terminals have the negative state.

The interface circuit may further include: a third signal terminal configured to output a third signal; and a fourth signal terminal configured to output a fourth signal, the third and fourth signals being complementary to each other. When the memory card is not connected, the controller may set the third and fourth signal terminals to a power saving mode.

If the controller detects that the memory card is connected, then the controller may drive the third and fourth signal terminals to a negative state in which a level of the third signal is smaller than a level of the fourth signal.

The controller is configured to perform a link connection with the memory card through the first to fourth signal terminals after the third and fourth signal terminals are driven to the negative state.

The controller may be configured to check a connection with the memory card, and to detect that the memory card is disconnected when the connection fails.

The controller may check the connection when a communication error with the memory card occurs and/or periodically.

At least one other example embodiment of inventive concepts provides a memory card. According to at least this example embodiment, the memory card includes: a first output terminal configured to output a first output signal; a second output terminal configured to output a second output signal, the first and second output signals being complementary to each other; a first input terminal configured to receive a first input signal; a second input terminal configured to receive a second input signal, the first and second input signals being complementary to each other; a controller; and a nonvolatile memory configured to operate according to a control of the controller. Upon a supply of power from an external device, the controller is configured to: drive the first and second output terminals such that a level of the first output signal is smaller than a level of the second output signal, and drive the first and second input terminals to a ground level.

The controller may be configured to perform a link connection with the external device in response to detecting, through the first and second input terminals, that a level of the first input signal is smaller than a level of the second input signal.

The memory card may be a detachable portable storage.

At least one other example embodiment provides a universal flash storage (UFS) device. According to at least this example embodiment, the UFS device includes a UFS memory controller. In response to being connected to a UFS host, the UFS memory controller is configured to: perform a power-on reset operation of the UFS device in response to receiving power from the UFS host; notify the UFS host that the UFS device is connected to the UFS host; and exchange configuration information with the UFS host.

The UFS memory controller may be further configured to determine whether the UFS host is in a ready state, and to exchange the configuration information only after the UFS host is in the ready state.

The UFS memory controller may be configured to notify the UFS host that the UFS device is connected to the UFS host by outputting signals through an upstream data lane between the UFS device and the UFS host. The UFS memory controller may be further configured to output data to the UFS host via the upstream data lane.

The configuration information may include at least one of: a pattern for adjusting synchronization with the UFS host; capacity information for the UFS device; and functions supported by the UFS device.

The UFS device may further include a nonvolatile memory coupled to the UFS memory controller.

The UFS device may be connected to and accessed by the UFS host without rebooting or shutting down the UFS host.

At least one other example embodiment provides a universal flash storage (UFS) host. According to at least this example embodiment, the UFS host includes a UFS storage interface. The UFS storage interface is configured to: detect connection of a UFS device to the UFS host based on a notification signal from the UFS device; output a ready state notification signal to the UFS device, the ready state notification signal indicating that the UFS host is ready to exchange configuration information with the UFS device; and exchange configuration information with the UFS device.

The UFS storage interface may include: an interconnect unit configured to output the ready state notification signal to the UFS device via a downstream data lane between the UFS host and the UFS device. The UFS storage interface may be further configured to output data to the UFS device via the downstream data lane.

The interconnect unit may be further configured to receive the notification signal from the UFS device via an upstream data lane between the UFS device and the UFS host.

The UFS storage interface may be further configured to receive data from the UFS device via the upstream data lane.

The configuration information may include at least one of: a pattern for adjusting synchronization with the UFS device; capacity information for the UFS device; and functions supported by the UFS device.

The UFS storage interface may access the UFS device without rebooting or shutting down the UFS host.

At least one other example embodiment provides a memory card. According to at least this example embodiment, the memory card includes: a nonvolatile memory; and a universal flash storage (UFS) memory controller coupled to the nonvolatile memory. The UFS memory controller is configured to: perform a power-on reset operation in response to receiving power from a UFS host; notify the UFS host that the memory card is connected to the UFS host; and exchange configuration information with the UFS host.

The UFS memory controller may be further configured to determine whether the UFS host is in a ready state, and to exchange the configuration information only after the UFS host is in the ready state.

The UFS memory controller may be further configured to: notify the UFS host that the UFS device is connected to the UFS host by outputting signals through an upstream data lane between the UFS device and the UFS host; and output data to the UFS host via the upstream data lane.

The memory card may be connected to and accessed by the UFS host without rebooting or shutting down the UFS host.

With example embodiments of inventive concepts, a memory card may notify a connection with a host to the host by driving output terminals with a negative state. Based on notification from the memory card, a link connection may be made between the host and the memory card. Thus, memory cards according to example embodiments may support a hot plug function and/or have improved performance. Example embodiments also provide interface circuits to communicate with memory cards supporting hot plug functions and/or having improved performance.

In accordance with example embodiments, memory cards and/or UFS devices may be connected to and accessed by host computer systems without rebooting and/or shutting down the host computer system. For example, memory cards and/or UFS devices may be connected to and accessed by the host computer system without significant interruption to the operation of the host computer system.

BRIEF DESCRIPTION OF THE FIGURES

Example embodiments will become apparent from the following description with reference to the following figures, wherein like reference numerals refer to like parts throughout the various figures unless otherwise specified, and wherein.

DETAILED DESCRIPTION

Figure 1:
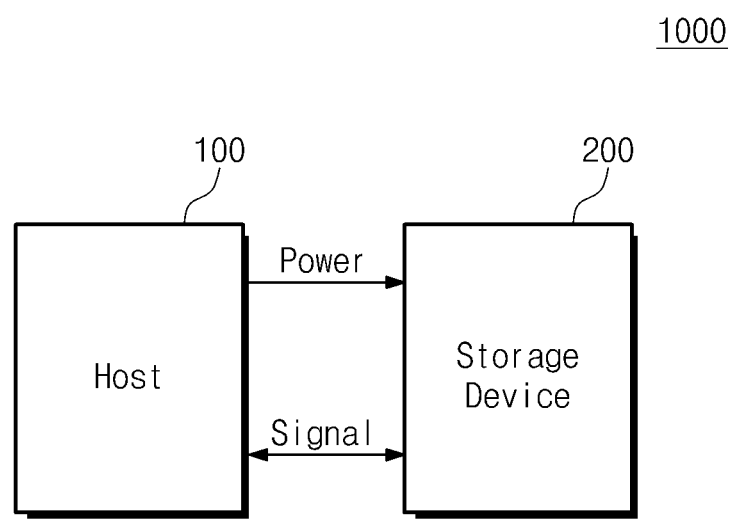
FIG. 1 is a block diagram schematically illustrating a computing device according to an example embodiment of inventive concepts.

Example embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

As discussed herein, example embodiments and/or one or more components thereof (e.g., host devices, storage devices, processors, controllers, storage interfaces, interconnect layers, host interfaces, decoder circuits, control logic circuits, page buffer circuits, data input/output circuits, error correction circuits, memory interfaces, etc.) may be hardware, firmware, hardware executing software or any combination thereof. When example embodiments and/or one or more components thereof are hardware, such hardware may include one or more Central Processing circuits (CPUs), system-on-chips (SOCs), digital signal processors (DSPs), application-specific-integrated-circuits (ASICs), field programmable gate arrays (FPGAs) computers or the like configured as special purpose machines to perform the functions described herein. CPUs, SOCs, DSPs, ASICs and FPGAs may sometimes generally be referred to as processors and/or microprocessors.

FIG. 1 is a block diagram schematically illustrating a computing device 1000 according to an example embodiment of inventive concepts.

Referring to FIG. 1, a computing device 1000 includes a host device 100 and a storage device 200.

The host device 100 stores and reads data using the storage device 200. The host device 100 supplies power to the storage device 200 and exchanges signals with the storage device 200. The host device 100 stores data in the storage device 200, reads data from the storage device 200, and erases data stored in the storage device 200. The host device 100, for example, may include a computer device, a special-purpose computer, a smart phone, a smart pad, a smart television, etc.

The storage device 200 performs write, read, and erase operations under control of the host device 100. The storage device 200 is supplied with power from the host device 100 and exchanges signals with the host device 100. The storage device 200 may include a nonvolatile memory, such as flash memory, phase change random access memory (PRAM), magnetic RAM (MRAM), resistive RAM (RRAM), or the like. For example, the storage device 200 may be a detachable memory card that is attached to or detached from the host device 100.

Figure 2:
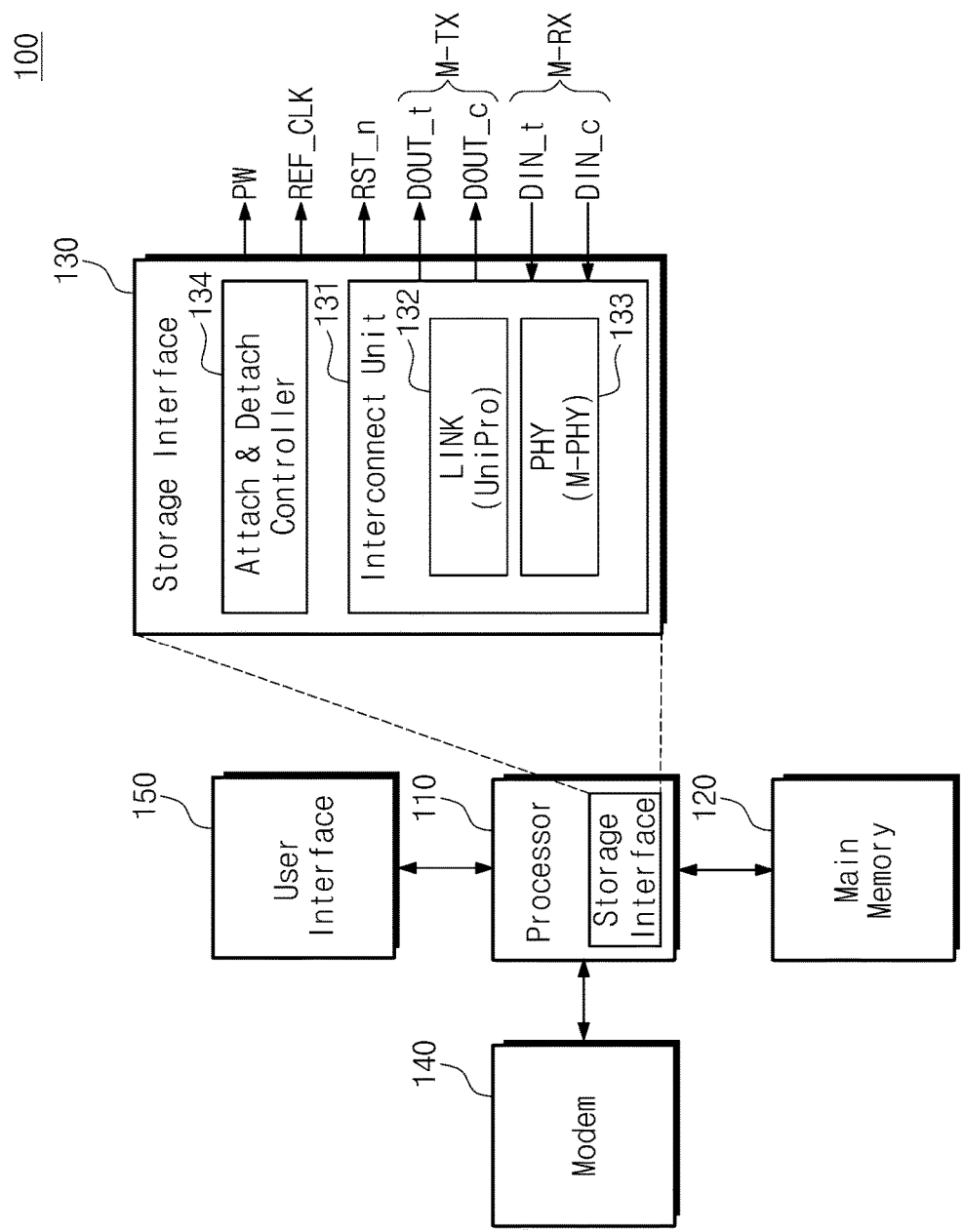
FIG. 2 is a block diagram schematically illustrating a host device according to an example embodiment of inventive concepts.

FIG. 2 is a block diagram schematically illustrating a host device 100 according to an example embodiment of inventive concepts.

Referring to FIGS. 1 and 2, the host device 100 includes: a processor 110; a memory 120; a modem 140; and a user interface 150.

The processor 110 controls overall operation of the host device 100 and performs logical operations. For example, the processor 110 may be a system-on chip (SoC). The processor 110 may be a processor used in a computer device, a special-purpose processor used in a special-purpose computer, or an application processor used in a mobile computing device.

The processor 110 contains a storage interface 130. The storage interface 130 may provide a communication interface between a host device 100 and a storage device 200. FIG. 2 illustrates an example in which the storage interface 130 is placed inside the processor 110. However, inventive concepts are not limited thereto. The storage interface 130 may be included as a component that is separated from a processor, such as a chipset. The storage interface 130 will be more fully described herein with reference to accompanying drawings.

The memory 120 communicates with the processor 110. The memory 120 may be a main memory of the processor 110 or a host device 100. The processor 110 stores code or data temporarily at the memory 120. The processor 110 executes code using the memory 120 to process data. The processor 110 may execute software, such as an operating system, an application, etc., using the memory 120. The processor 110 controls overall operation of the host device 100 using the memory 120. The memory 120 may include a volatile memory, such as static RAM (SRAM), dynamic RAM (DRAM), synchronous DRAM (SDRAM) or the like, or a nonvolatile memory, such as ferroelectric RAM (FRAM), PRAM, MRAM, RRAM or the like. The memory 120 may be a random access memory.

The modem 140 communicates with an external device according to a control of the processor 110. For example, the modem 140 communicates with an external device based on one or more wireless communication protocols including, LTE (Long Term Evolution), WiMAX (Worldwide Interoperability for Microwave Access), GSM (Global System for Mobile communication), CDMA (Code Division Multiple Access), Bluetooth, NFC (Near Field Communication), WiFi, RFID (Radio Frequency IDentification), and the like, or wired communication protocols including USB (Universal Serial Bus), SATA (Serial AT Attachment), SCSI (Small Computer System Interface), Firewire, PCI (Peripheral Component Interconnection), and the like.

The user interface 150 communicates with a user according to a control of the processor 110. For example, the user interface 150 may include user input interfaces, such as a keyboard, a keypad, a button, a touch panel, a touch screen, a touch pad, a touch ball, a camera, a microphone, a gyroscope sensor, a vibration sensor, and so on. The user interface 150 may further include user output interfaces, such as an LCD (liquid crystal display) device, an OLED (Organic Light Emitting Diode) display device, an AMOLED (Active Matrix OLED) display device, an LED, a speaker, a motor, and so on.

The storage interface 130 includes an interconnect unit 131 and an attach/detach controller 134.

The interconnect unit 131 manages communications between the processor 110 and a storage device 200. The interconnect unit 131 includes a link layer portion 132 and a physical layer portion 133.

The link layer portion 132 generates a transmission signal according to a given (or alternatively desired or predetermined) rule (e.g., communications protocol). The link layer portion 132 receives a reception signal according to a given (or alternatively desired or predetermined) rule. The link layer portion 132 may include a physical adaptor layer L1.5, a data link layer L2, a network layer L3, and a transport layer L4 of OSI (Open Systems Interconnection) layers. The link layer portion 132 may form a DME (Device Management Entity). The link layer portion 132 includes "UniPro" that is defined by the MIPI alliance.

The physical layer portion 133 transmits a transmission signal according to a given (or alternatively desired or predetermined) rule. The physical layer portion 133 receives a reception signal according to a given (or alternatively desired or predetermined) rule. The physical layer portion 133 may include a physical layer L1 of the OSI layers. The physical layer portion 133 includes "M-PHY" that is defined by the MIPI alliance.

The attach/detach controller 134 detects whether or not the storage interface 130 is connected to the storage device 200 through the interconnect unit 131. The attach/detach controller 134 detects whether or not the storage device 200 is connected to the host device 100 and controls such that the host device 100 performs a link connection with the storage device 200 according to the detection result. For example, the attach/detach controller 134 transmits an interrupt to the processor 110 according to the detection result. The attach/detach controller 134 detects whether or not the storage device 200 is connected to the host device 100, and controls such that the host device 100 terminates a link connection with the storage device 200 according to the detection result. For example, the attach/detach controller 134 transmits an interrupt to the processor 110 according to the detection result.

The storage interface 130 has a first output terminal DOUT_t, a second output terminal DOUT_c, a first input terminal DIN_t, a second input terminal DIN_c, a reset terminal RST_n, and a clock terminal REF_CLK.

The storage interface 130, in particular the interconnect unit 131, transfers signals to the storage device 200 through the first output terminal DOUT_t and the second output terminal DOUT_c. The first output terminal DOUT_t and the second output terminal DOUT_c may constitute a transmission channel M-TX of the storage interface 130. The first output terminal DOUT_t and the second output terminal DOUT_c may be controlled to have one of at least four states. The first output terminal DOUT_t and the second output terminal DOUT_c may be controlled to have a positive state DIF-P, a negative state DIF-N, a ground state DIF-Z, or a floating state DIF-Q.

When a level (e.g., a voltage level) of a first output signal on the first output terminal DOUT_t is greater than that of a second output signal on the second output terminal DOUT_c, the first output terminal DOUT_t and the second output terminal DOUT_c may have the positive state DIF-P. When a level of the first output signal on the first output terminal DOUT_t is smaller than that of the second output signal on the second output terminal DOUT_c, the first output terminal DOUT_t and the second output terminal DOUT_c may have the negative state DIF-N. In the event that the first output terminal DOUT_t and the second output terminal DOUT_c are floating, they may have the floating state DIF-Q. When a level of the first output signal on the first output terminal DOUT_t is equal or substantially equal to that of the second output signal on the second output terminal DOUT_c, the first output terminal DOUT_t and the second output terminal DOUT_c may have the ground state DIF-Z. For example, if the first output terminal DOUT_t and the second output terminal DOUT_c have the floating state DIF-Q and terminals connected to the floating state DIF-Q are at the ground state DIF-Z, then the first output terminal DOUT_t and the second output terminal DOUT_c may be also driven with the ground state DIF-Z.

In a state where the storage device 200 is not connected, the interconnect unit 131 sets the first output terminal DOUT_t and the second output terminal DOUT_c to the floating state DIF-Q according to control of the attach/detach controller 134. In a state where the storage device 200 is connected, the interconnect unit 131 transmits information using the positive state DIF-P and the negative state DIF-N of the first output terminal DOUT_t and the second output terminal DOUT_c. That is, for example, the interconnect unit 131 transmits information by transferring a first output signal on the first output terminal DOUT_t and a second output signal on the second output terminal DOUT_c in a complementary manner. In the event that information to be sent to the storage device 200 does not exist with the storage device 200 connected (e.g., in a power-saving mode), the interconnect unit 131 sets the first output terminal DOUT_t and the second output terminal DOUT_c to the floating state DIF-Q. Terminals of the storage device 200 connected to the first output terminal DOUT_t and the second output terminal DOUT_c may have a reception standby state (e.g., the ground state DIF-Z). That is, for example, the first output terminal DOUT_t and the second output terminal DOUT_c may be set to the ground state DIF-Z.

The storage interface 130, in particular, the interconnect unit 131 receives signals from the storage device 200 through the first input terminal DIN_t and the second input terminal DIN_c. The first input terminal DIN_t and the second input terminal DIN_c may constitute a reception channel M-RX of the storage interface 130. The first input terminal DIN_t and the second input terminal DIN_c may be controlled to have one of at least four states. The first input terminal DIN_t and the second input terminal DIN_c may be controlled to have the positive state DIF-P, the negative state DIF-N, the ground state DIF-Z, or the floating state DIF-Q.

When a level (e.g., a voltage level) of a first input signal on the first input terminal DIN_t is greater than that of a second input signal on the second input terminal DIN_c, the first input terminal DIN_t and the second input terminal DIN_c may have the positive state DIF-P. When a level (e.g., a voltage level) of the first input signal on the first input terminal DIN_t is smaller than that of the second input signal on the second input terminal DIN_c, the first input terminal DIN_t and the second input terminal DIN_c may have the negative state DIF-N. In the event that the first input terminal DIN_t and the second input terminal DIN_c are connected to a ground terminal, they may have the ground state DIF-Z. When the first input terminal DIN_t and the second input terminal DIN_c are floating, they may have the floating state DIF-Q.

In a state where the storage device 200 is not connected, the interconnect unit 131 sets the first input terminal DIN_t and the second input terminal DIN_c to the ground state DIF-Z according to control of the attach/detach controller 134. In a state where the storage device 200 is connected, the interconnect unit 131 receives information using the positive state DIF-P and the negative state DIF-N of the first input terminal DIN_t and the second input terminal DIN_c. For example, the interconnect unit 131 drives the first input terminal DIN_t and the second input terminal DIN_c with the ground state DIF-Z. At this time, the first input terminal DIN_t and the second input terminal DIN_c may be controlled according to signals received via the first input terminal DIN_t and the second input terminal DIN_c. For example, if signals received via the first input terminal DIN_t and the second input terminal DIN_c are in the positive state DIF-P, then they may be set to the positive state DIF-P. When signals received via the first input terminal DIN_t and the second input terminal DIN_c are in the negative state DIF-N, they may be set to the negative state DIF-N. In the event that signals are not received via the first input terminal DIN_t and the second input terminal DIN_c, the first input terminal DIN_t and the second input terminal DIN_c may maintain the ground state DIF-Z. That is, for example, the interconnect unit 131 may identify information by receiving a first input signal on the first input terminal DIN_t and a second input signal on the second input terminal DIN_c in a complementary manner.

The storage interface 130 transmits a reset signal to the storage device 200 through the reset terminal RST_n. The storage interface 130 provides the storage device 200 with a clock signal via the clock terminal REF_CLK. The storage interface 130 provides power to the storage device 200 via a power terminal PW.

In at least some example embodiments, the storage interface 130 may be a UFS (Universal Flash Storage) interface.

The processor 110 operates according to an interrupt signal that is generated by the attach/detach controller 134. If the attach/detach controller 134 issues an interrupt indicating that the storage device 200 is connected, then a storage space of the storage device 200 may be added under the control of the processor 110. If the attach/detach controller 134 issues an interrupt indicating that the storage device 200 is detached, the storage space of the storage device 200 may be removed under the control of the processor 110.

Figure 3:
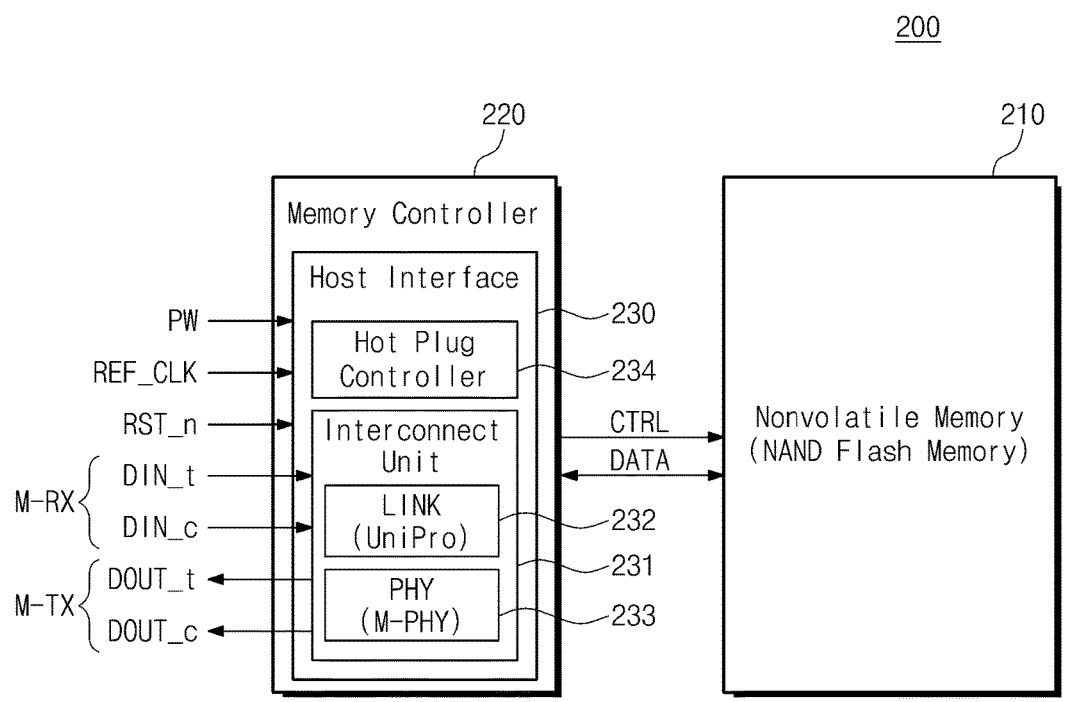
FIG. 3 is a block diagram schematically illustrating a storage device according to an example embodiment of inventive concepts.

FIG. 3 is a block diagram schematically illustrating a storage device 200 according to an example embodiment of inventive concepts.

Referring to FIGS. 1 to 3, a storage device 200 includes a nonvolatile memory 210 and a memory controller 220.

The nonvolatile memory 210 performs write, read, and erase operations according to a control of the memory controller 220. The nonvolatile memory 210 may include a NAND flash memory. However, inventive concepts are not limited thereto. The nonvolatile memory 210 may contain at least one of a variety of nonvolatile memories, such as PRAM, MRAM, RRAM, FRAM, and so on.

The memory controller 220 is configured to control the nonvolatile memory 210 according to a request from a host device 100. The memory controller 220 sends a control signal to the nonvolatile memory 210 and exchanges data with the nonvolatile memory 210. The memory controller 220 may have a host interface 230 that communicates with the host device 100. The host interface 230 includes an interconnect unit 231 and a hot plug controller 234.

The interconnect unit 231 manages communications between a host device 100 and the memory controller 220. The interconnect unit 231 contains a link layer portion 232 and a physical layer portion 233.

The link layer portion 232 generates a transmission signal according to a given (or alternatively desired or predetermined) rule (e.g., communications protocol). The link layer portion 232 receives a reception signal according to a given (or alternatively desired or predetermined) rule. The link layer portion 232 may include a physical adaptor layer L1.5, a data link layer L2, a network layer L3, and a transport layer L4 of OSI (Open Systems Interconnection) layers. The link layer portion 232 may form a DME (Device Management Entity). The link layer portion 232 includes "UniPro" that is defined by the MIPI alliance.

The physical layer portion 233 transmits a transmission signal according to a given (or alternatively desired or predetermined) rule. The physical layer portion 233 receives a reception signal according to a given (or alternatively desired or predetermined) rule. The physical layer portion 233 may include a physical layer L1 of the OSI layers. The physical layer portion 233 includes "M-PHY" that is defined by the MIPI alliance.

The hot plug controller 234 controls the interconnect unit 231 such that the storage device 200 notifies the host device 100 that the storage device 200 is connected to the host device 100.

The host interface 230 contains a first output terminal DOUT_t, a second output terminal DOUT_c, a first input terminal DIN_t, a second input terminal DIN_c, a reset terminal RST_n, and a clock terminal REF_CLK.

The host interface 230, in particular, the interconnect unit 231 transfers signals to the host device 100 through the first output terminal DOUT_t and the second output terminal DOUT_c. The first output terminal DOUT_t and the second output terminal DOUT_c may constitute a transmission channel M-TX of the host interface 230. The first output terminal DOUT_t and the second output terminal DOUT_c may be controlled to have one of at least four states. The first output terminal DOUT_t and the second output terminal DOUT_c may be controlled to have a positive state DIF-P, a negative state DIF-N, a ground state DIF-Z, or a floating state DIF-Q.

When a level (e.g., a voltage level) of a first output signal on the first output terminal DOUT_t is greater than that of a second output signal on the second output terminal DOUT_c, the first output terminal DOUT_t and the second output terminal DOUT_c may have the positive state DIF-P. When a level of the first output signal on the first output terminal DOUT_t is smaller than that of the second output signal on the second output terminal DOUT_c, the first output terminal DOUT_t and the second output terminal DOUT_c may have the negative state DIF-N. In the event that the first output terminal DOUT_t and the second output terminal DOUT_c are floating, they may have the floating state DIF-Q. When a level of the first output signal on the first output terminal DOUT_t is equal or substantially equal to that of the second output signal on the second output terminal DOUT_c, the first output terminal DOUT_t and the second output terminal DOUT_c may have the ground state DIF-Z. For example, if the first output terminal DOUT_t and the second output terminal DOUT_c have the floating state DIF-Q and terminals connected to the floating state DIF-Q are in the ground state DIF-Z, the first output terminal DOUT_t and the second output terminal DOUT_c may be also driven with the ground state DIF-Z.

When connected to the host device 100, if power is supplied from the host device 100, then the interconnect unit 231 sets the first output terminal DOUT_t and the second output terminal DOUT_c to the negative state DIF-N according to control of the hot plug controller 234. In a state where the host device 100 is connected, the interconnect unit 231 transmits information using the positive state DIF-P and the negative state DIF-N of the first output terminal DOUT_t and the second output terminal DOUT_c. That is, for example, the interconnect unit 231 transmits information by transferring a first output signal on the first output terminal DOUT_t and a second output signal on the second output terminal DOUT_c in a complementary manner.

The host interface 230, in particular, the interconnect unit 231 receives signals from the host device 100 through the first input terminal DIN_t and the second input terminal DIN_c. The first input terminal DIN_t and the second input terminal DIN_c may constitute a reception channel M-RX of the host interface 230. The first input terminal DIN_t and the second input terminal DIN_c may be controlled to have one of at least four states. The first input terminal DIN_t and the second input terminal DIN_c may be controlled to have the positive state DIF-P, the negative state DIF-N, the ground state DIF-Z, or the floating state DIF-Q.

When a level (e.g., a voltage level) of a first input signal on the first input terminal DIN_t is greater than that of a second input signal on the second input terminal DIN_c, the first input terminal DIN_t and the second input terminal DIN_c may have the positive state DIF-P. When a level (e.g., a voltage level) of the first input signal on the first input terminal DIN_t is smaller than that of the second input signal on the second input terminal DIN_c, the first input terminal DIN_t and the second input terminal DIN_c may have the negative state DIF-N. In the event that the first input terminal DIN_t and the second input terminal DIN_c are connected to a ground terminal, they may have the ground state DIF-Z. When the first input terminal DIN_t and the second input terminal DIN_c are floating, they may have the floating state DIF-Q.

When the host device 100 is connected, if power is supplied from the host device 100, then the interconnect unit 231 sets the first input terminal DIN_t and the second input terminal DIN_c to the ground state DIF-Z according to control of the hot plug controller 234. In a state where the host device 100 is connected, the interconnect unit 231 receives information using the positive state DIF-P and the negative state DIF-N of the first input terminal DIN_t and the second input terminal DIN_c. That is, for example, the interconnect unit 231 identifies information by receiving a first input signal on the first input terminal DIN_t and a second input signal on the second input terminal DIN_c in a complementary manner.

The host interface 230 receives a reset signal from the host device 100 through the reset terminal RST_n. The host interface 230 receives a clock signal from the host device 100 via the clock terminal REF_CLK. The host interface 230 is supplied with power from the host device 100 via a power terminal PW.

In at least some example embodiments, the host interface 230 may be a UFS (Universal Flash Storage) interface.

Figure 4:
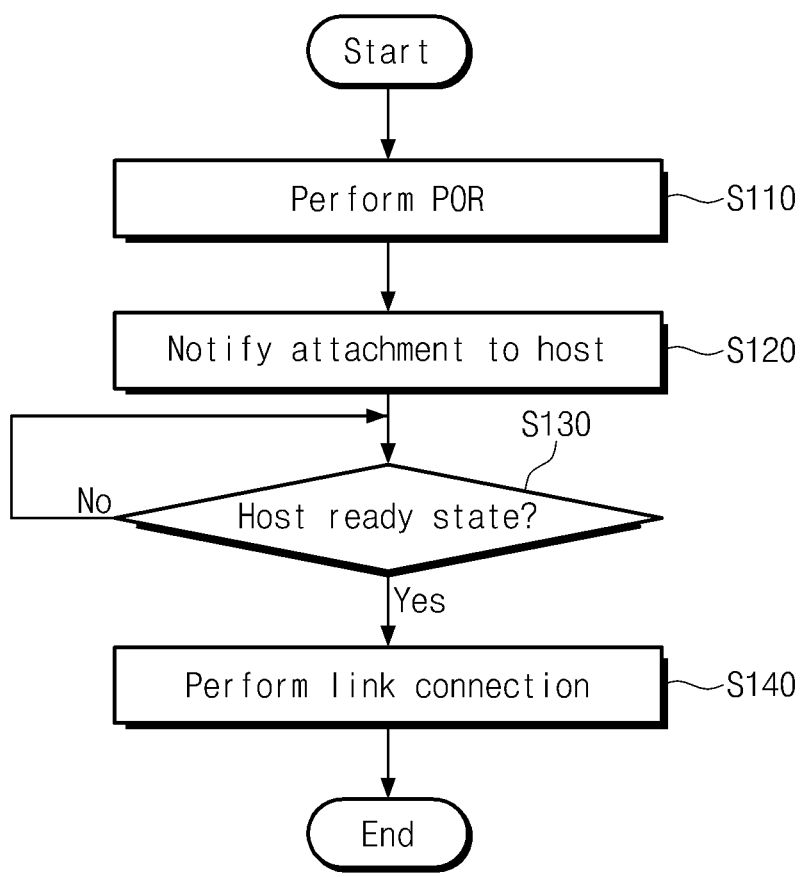
FIG. 4 is a flow chart schematically illustrating an operating method of a storage device according to an example embodiment of inventive concepts.

FIG. 4 is a flow chart schematically illustrating an operating method of a storage device 200 according to an example embodiment of inventive concepts. In FIG. 4, there is shown an operating method of a host interface 230 of a storage device 200.

Referring to FIGS. 1, 3, and 4, at S110 power-on reset may be performed. If a storage device 200 is connected to a host device 100, the host device 100 supplies power to the storage device 200. As power is supplied from the host device 100, a host interface 230 may perform the power-on reset; thus, the host interface 230 is reset. An interconnect unit 231 and a hot plug controller 234 of the host interface 230 may be reset.

At S120, the host interface 230 notifies such interconnection to the host device 100. If the power-on reset is completed, the hot plug controller 234 and the interconnect unit 231 may be operable; thus, under control of the hot plug controller 234, the interconnect unit 231 notifies to the host device 100 that the storage device 200 is connected to the host device 100. The interconnect unit 231 sends a signal indicating such interconnection to the host device 100 according to control of the hot plug controller 234. The signal indicating such interconnection may be transferred through a first output terminal DOUT_t and a second output terminal DOUT_c. That is, for example, the interconnect unit 231 informs the host device 100 of such interconnection using the first output terminal DOUT_t and the second output terminal DOUT_c, not a separate terminal for informing such interconnection.

At S130, the host interface 230 determines whether or not the host device 100 is in a ready state. For example, the host interface 230 determines whether or not a signal informing a ready state is received from the host device 100. The interconnect unit 231 determines whether or not a signal informing a ready state is received via the first input terminal DIN_t and the second input terminal DIN_c, not a separate terminal. The storage device 200 waits until the host device 100 enters the ready state.

If the host device 100 enters the ready state, at S140 the host interface 230 performs a link connection with the host device 100. For example, the host interface 230 exchanges a pattern for adjusting synchronization with the host device 100. The host interface 230, for example, sends a first pattern to the host device 100 and receives a second pattern from the host device 100. The synchronization may be adjusted based on the first and second patterns. The host interface 230 provides the host device 100 with information about a capacity of the storage device 200 and functions supported by the storage device 200.

Figure 5:
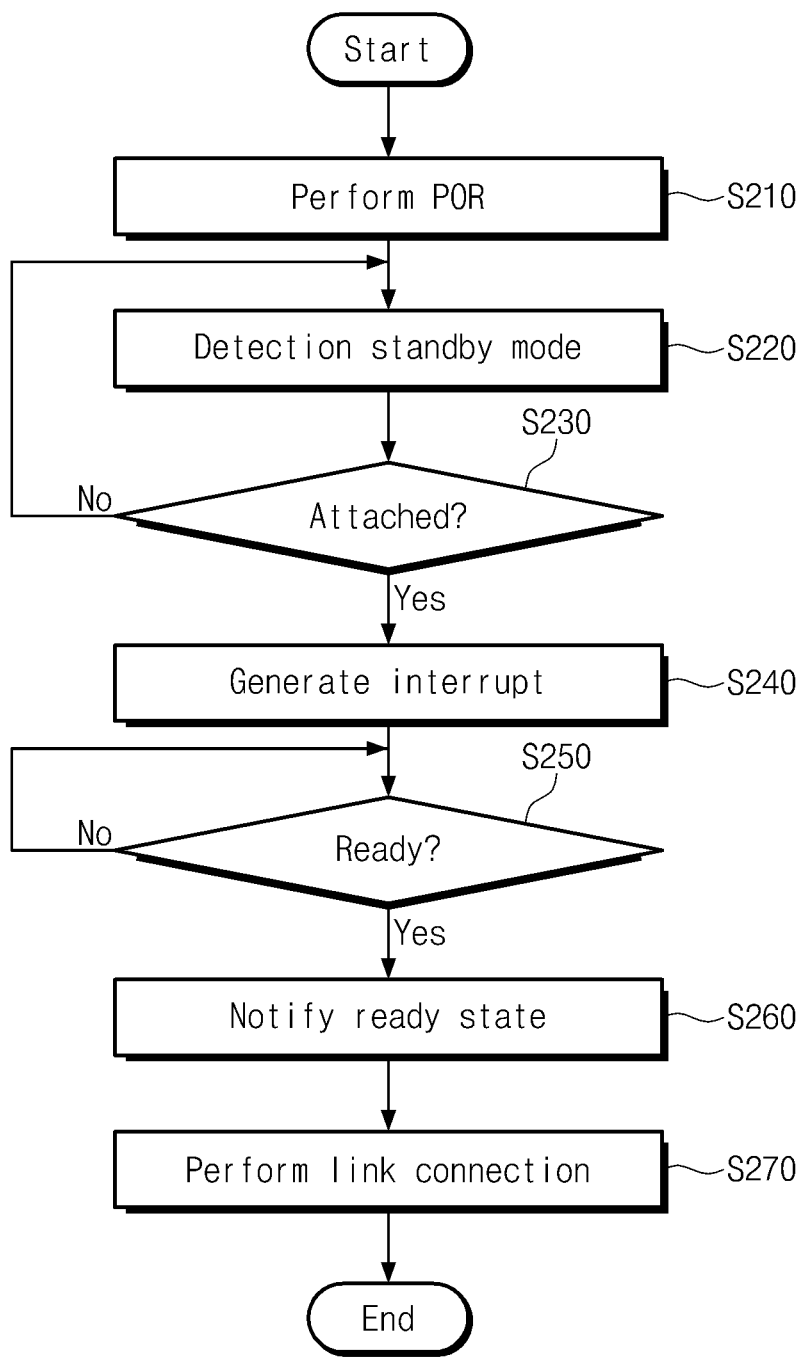
FIG. 5 is a flow chart schematically illustrating an operating method of a host device according to an example embodiment of inventive concepts.

FIG. 5 is a flow chart schematically illustrating an operating method of a host device 100 according to an example embodiment of inventive concepts. In FIG. 5, there is shown an operating method of a storage interface 130 of a host device 100.

Referring to FIGS. 1, 2, and 5, at S210 power-on reset may be performed. As power is supplied, a storage interface 130 may perform the power-on reset; thus, the storage interface 130 is reset. An interconnect unit 131 and an attach/detach controller 134 of the storage interface 130 may be reset.

At S220, the storage interface 130 is set to a detection standby mode in which the storage interface 130 detects whether or not a storage device 200 is connected to the storage interface 130.

At S230, whether or not the storage device 200 is connected to the storage interface 130 is determined. For example, the storage interface 130 determines whether or not a signal (e.g., a notification signal) informing interconnection is received from the storage device 200. The storage interface 130 determines whether or not a signal informing interconnection is received via a first input terminal DIN_t and a second input terminal DIN_c, not a separate terminal. If a signal informing interconnection is not received, then the storage interface 130 maintains the detection standby mode.

If a signal informing interconnection is received, then at S240 the storage interface 130 issues an interrupt. For example, when a signal informing interconnection is received, the attach/detach controller 134 issues an interrupt notifying that the storage device 200 is connected.

At S250, the storage interface 130 determines whether it is ready to connect a link with the storage device 200. If it is ready to connect a link with the storage device 200, then at S260 the storage interface 130 indicates a ready state to the storage device 200. The storage interface 130 transmits a signal (e.g., ready state notification signal) indicating the ready state via a first output terminal DOUT_t and a second output terminal DOUT_c, not a separate terminal.

At S270, the storage interface 130 performs a link connection with the storage device 200. For example, the storage interface 130 exchanges a pattern for adjusting synchronization with the storage device 200.

The storage interface 130, for example, sends a first pattern to the storage device 200 and receives a second pattern from the storage device 200. Synchronization may be adjusted based on the first and second patterns. The storage interface 130 provides the storage device 200 with information about a capacity of the storage device 200 and functions supported by the storage device 200.

Figure 6:
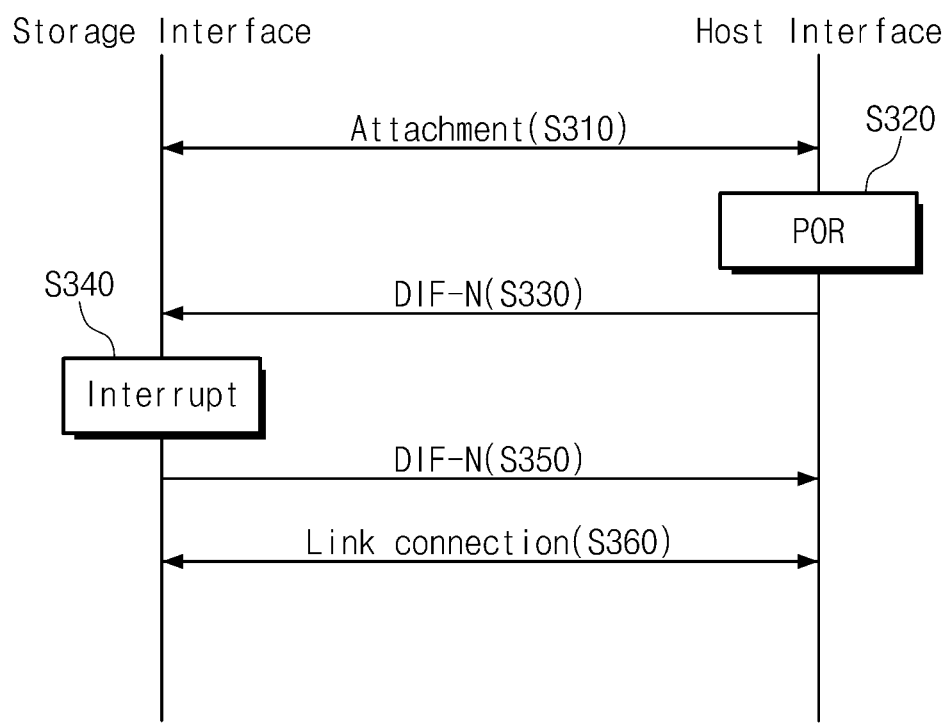
FIG. 6 is a flow chart schematically illustrating an example in which a host device and a storage device are connected, according to an example embodiment of inventive concepts.

FIG. 6 is a flow chart schematically illustrating an example embodiment in which a host device 100 and a storage device 200 are connected. In FIG. 6, there is illustrated an example where a storage device 200 is attached to a host device 100 that is running after power is supplied.

Referring to FIGS. 1 to 3 and 6, at S310 a storage interface 130 of the host device 100 and a host interface 230 of the storage device 200 are connected. At this time, the storage interface 130 supplies power to the host interface 230.

At S320, the host interface 230 performs a power-on reset operation. Provided with power from the storage interface 130, the host interface 230 performs the power-on reset operation.

If the power-on reset operation is ended, then at S330 the host interface 230 provides the storage interface 130 with a signal indicating interconnection. The host interface 230 may set, for example, a first output terminal DOUT_t and a second output terminal DOUT_c to a negative state DIF-N. That is, for example, under control of the host interface 230, a level of a signal on the first output terminal DOUT_t may be set to be smaller than a level of a signal on the second output terminal DOUT_c. Signals on the first output terminal DOUT_t and the second output terminal DOUT_c of the host interface 230 may be sent to a first input terminal DIN_t and a second input terminal DIN_c of the storage interface 130, respectively.

That is, for example, if the first output terminal DOUT_t and the second output terminal DOUT_c are set to the negative state DIF-N under control of the host interface 230, the negative state DIF-N may be transferred to the first input terminal DIN_t and the second input terminal DIN_c of the storage interface 130.

When the negative state DIF-N is received via the first input terminal DIN_t and the second input terminal DIN_c, the storage interface 130 issues an interrupt indicating that the storage device 200 is connected.

At S350, the storage interface 130 provides the host interface 230 with a signal indicating that the storage interface 130 is ready to perform a link connection. For example, the storage interface 130 sets the first output terminal DOUT_t and the second output terminal DOUT_c to a negative state DIF-N. That is, for example, according to control of the storage interface 130, a level of a signal on the first output terminal DOUT_t is set to be smaller than a level of a signal on the second output terminal DOUT_c. Signals of the first output terminal DOUT_t and the second output terminal DOUT_c of the storage interface 130 may be provided to the first input terminal DIN_t and the second input terminal DIN_c of the host interface 230, respectively. That is, for example, if the storage interface 130 drives the first output terminal DOUT_t and the second output terminal DOUT_c with the negative state DIF-N, then the negative state DIF-N may be transferred to the first input terminal DIN_t and the second input terminal DIN_c of the host interface 230, respectively.

At S360, a link connection between the storage interface 130 and the host interface 230 may be made.

If the link connection is completed, then the host device 100 may access the storage device 200. For example, the host device 100 writes data at the storage device 200, reads data from the storage device 200, and/or erases data stored in the storage device 200.

Figure 7:
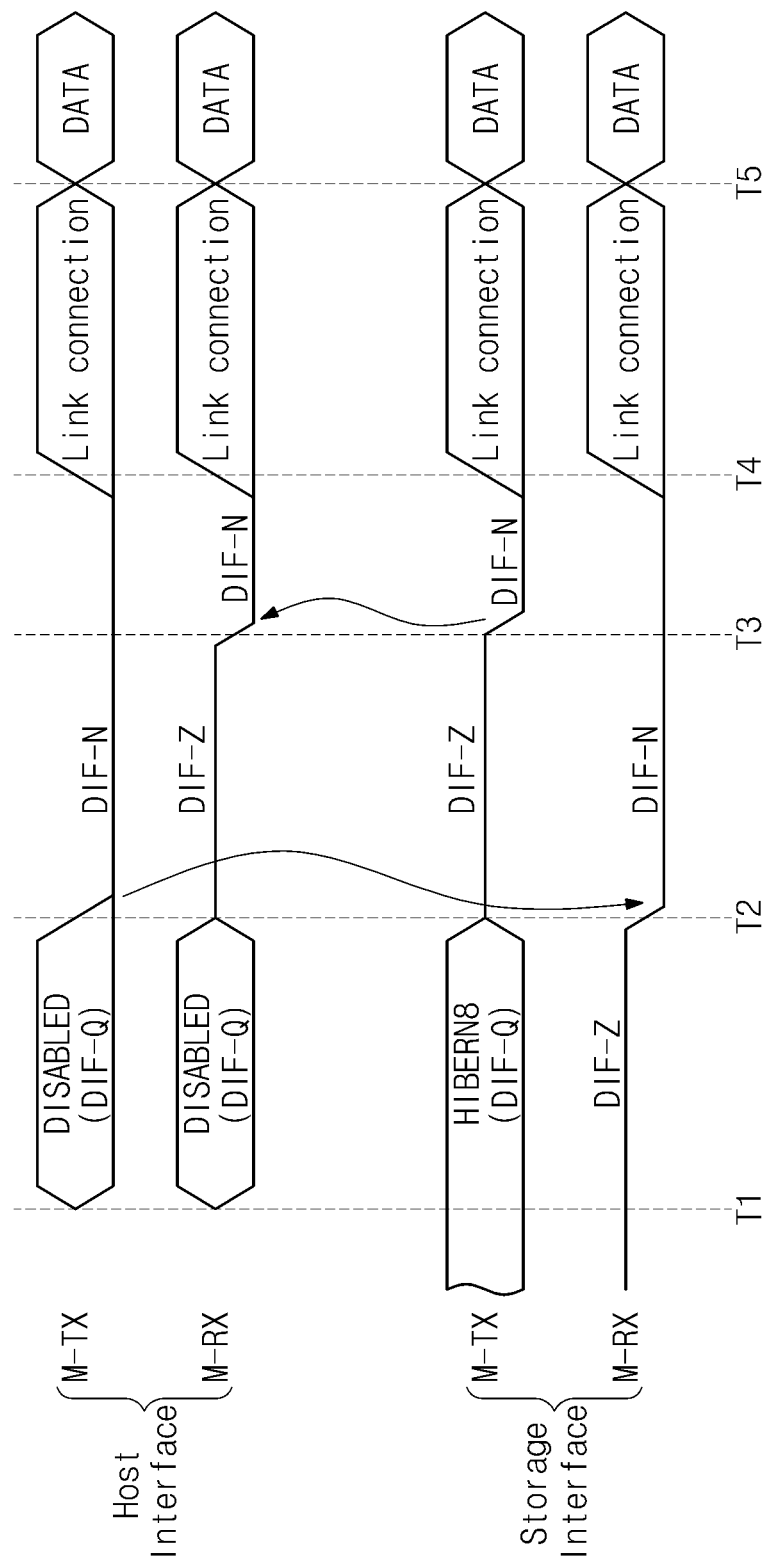
FIG. 7 is a timing diagram schematically illustrating an example of signals exchanged between a storage interface and a host interface, according to an example embodiment of inventive concepts.

FIG. 7 is a timing diagram schematically illustrating an example of signals exchanged between a storage interface 130 and a host interface 230, according to an example embodiment of inventive concepts.

FIG. 7 illustrates signals that are exchanged between a storage interface 130 and a host interface 230 when a storage device 200 is connected to a host device 100.

Referring to FIGS. 1 to 3 and 7, initially a storage device 200 and a host device 100 may not be connected. At this time, a host interface 230 does not operate, but a storage interface 130 is set to a detection standby mode.

In the detection standby mode, a transmission channel M-TX of the storage interface 130 may be in a power saving mode. For example, the transmission channel M-TX of the storage interface 130 may be in a "HIBERN8" state that is defined by a UFS specification. At this time, a first output terminal DOUT_t and a second output terminal DOUT_c of the transmission channel M-TX may have a floating state DIF-Q.

In the detection standby mode, a reception channel M-RX of the storage interface 130 may be set to a reception standby mode. For example, a first input terminal DIN_t and a second input terminal DIN_c of the storage interface 130 may be driven with a ground state DIF-Z.

At T1, the storage device 200 is connected to the host device 100. That is, for example, a host interface 230 of the storage device 200 may be connected to the storage interface 130 of the host device 100. The storage interface 130 supplies power to the host interface 230.

As power is supplied from the storage interface 130, a transmission channel M-TX of the host interface 230 performs a power-on reset operation. For example, the transmission channel M-TX of the host interface 230 enters a "DISABLED" state that is defined by the UFS specification, and then performs the power-on reset operation. At this time, the first output terminal DOUT_t and the second output terminal DOUT_c of the transmission channel M-TX have a floating state DIF-Q.

As power is supplied from the storage interface 130, a reception channel M-RX of the host interface 230 performs a power-on reset operation. For example, the reception channel M-RX of the host interface 230 enters a "DISABLED" state that is defined by the UFS specification, and then performs the power-on reset operation. At this time, the first input terminal DIN_t and the second input terminal DIN_c of the reception channel M-RX have the floating state DIF-Q.

At T2, the power-on reset operation of the host interface 230 is ended, so the transmission channel M-TX of the host interface 230 notifies the host device 100 that the storage device 200 is connected to the host device 100. The transmission channel M-TX, for example, may transmit a negative state DIF-N. The first output terminal DOUT_t and the second output terminal DOUT_c of the transmission channel M-TX are driven with the negative state DIF-N. A level of a signal on the first output terminal DOUT_t may become smaller than a level of a signal on the second output terminal DOUT_c. A hot plug controller 234 controls the transmission channel M-TX of an interconnect unit 231 so as to output the negative state DIF-N as the power-on reset operation is ended.

As the power-on reset operation is ended, the reception channel M-RX of the host interface 230 enters a reception standby state. For example, the first input terminal DIN_t and the second input terminal DIN_c of the reception channel M-RX may be driven with a ground state DIF-Z.

The negative state DIF-N is received via the reception channel M-RX of the storage interface 130 because the transmission channel M-TX of the host interface 230 is driven with the negative state DIF-N. In at least some example embodiments, when the transmission channel M-TX of the storage interface 130 has a "HIBERN8" state, the storage interface 130 detects the negative state DIF-N. For example, when the transmission channel M-TX of the storage interface 130 has a "HIBERN8" state and the reception channel M-RX has the ground state DIF-Z, the storage interface 130 may be in a squelch state that is defined by the M-PHY specification. If the reception channel M-RX is driven with the negative state DIF-N in the squelch state, then the storage interface 130 detects a "non-squelch" state that is defined by the M-PHY specification. When the non-squelch state is detected, the storage interface 130 performs "HIBERN8" exit control that is defined by the M-PHY specification. That is, for example, at T2 the storage interface 130 initiates an operation of exiting the power-saving mode of the transmission channel M-TX, that is, the "HIBERN8" state. As there is detected that the reception channel M-RX of the interconnect unit 131 is driven with the negative state DIF-N, an attach/detach controller 134 issues an interrupt.

Also, since the reception channel M-RX of the host interface 230 is driven with the ground state DIF-Z, the transmission channel M-TX having the floating state DIF-Q may be driven with the ground state DIF-Z.

At T3, the power saving mode of the transmission channel M-TX of the storage interface 130 is exited. That is, for example, the transmission channel M-TX of the storage interface 130 that has been set to the "HIBERN8" state may enter an "ACTIVE" state. In this case, the transmission channel M-TX notifies the host interface 230 that it is ready to perform a link connection. For example, the transmission channel M-TX outputs the negative state DIF-N. The negative state DIF-N is received via the reception channel M-RX of the host interface 230 because the transmission channel M-TX of the storage interface 130 is driven with the negative state DIF-N.

Afterwards, at T4 a link connection between the storage interface 130 and the host interface 230 may be made.

At T5, if the link connection is ended, then the storage interface 130 exchanges data with the host interface 230. For example, the host interface 230 may transfer a write command, a read command, and/or an erase command to the storage interface 130. The storage interface 130 may provide the host interface 230 with an address. The storage interface 130 sends write data to the host interface 230. The host interface 230 transmits read data to the storage interface 130.

Figure 8:
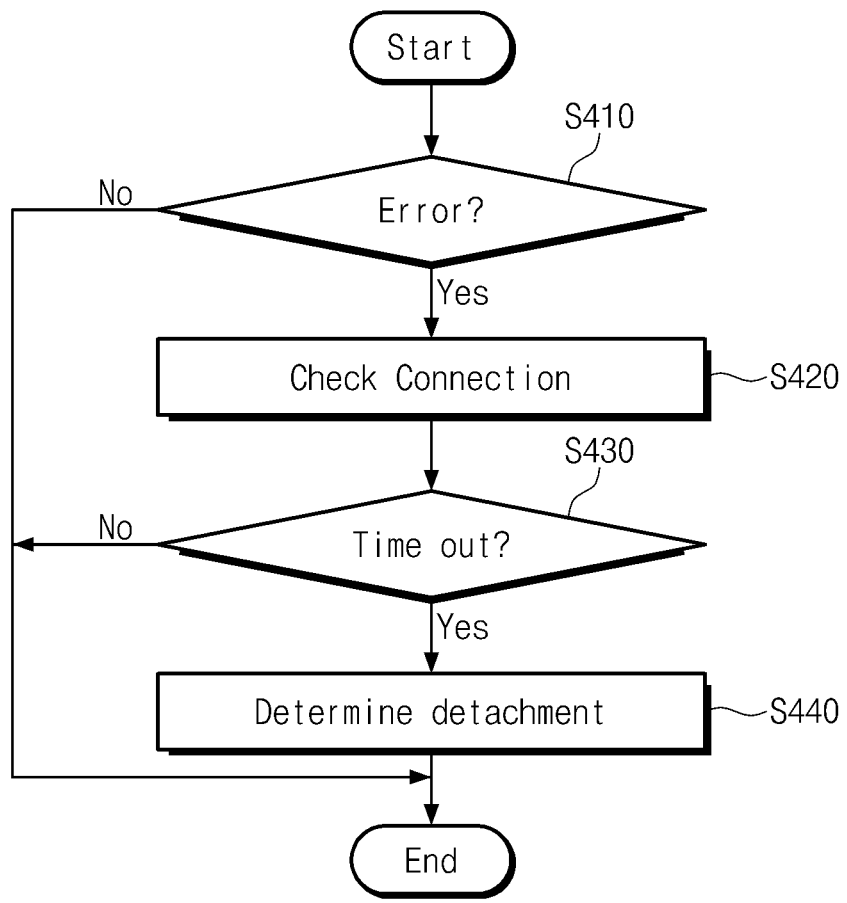
FIG. 8 is a flow chart schematically illustrating an operating method of a host device according to another example embodiment of inventive concepts.

FIG. 8 is a flow chart schematically illustrating an operating method of a host device 100 according to another example embodiment of inventive concepts. In FIG. 8, there is illustrated an operating method of a storage interface 130 when there is detected that a storage device 200 is detached from a host device 100.

Referring to FIGS. 1, 2, and 8, at S410 whether or not an error occurs may be determined. For example, whether or not an error occurs may be determined when the storage interface 130 communicates with a host interface 230. For example, in the event that the storage interface 130 transmits a write or erase command to the host interface 230, whether or not a timeout occurs may be determined. The timeout may be a restricted time interval that is allocated to a write or erase operation of the storage device 200. For example, in the event that the storage interface 130 transfers a read command to the host interface 230, whether or not only a portion of requested data is received or whether or not a timeout occurs may be determined.

If an error is not detected, the method is ended. If an error is detected, at S420 a connection is checked. The storage interface 130 checks a connection with the host interface 230. For example, the storage interface 130 sends "NOP Out" transaction, which is defined by the UFS specification, to the host interface 230.

At S430, whether or not a timeout occurs is determined. During an operation of checking the connection, the storage interface 130 determines whether or not the timeout occurs. For example, the storage interface 130 determines whether or not "NOP In" transaction, which is defined by the UFS specification, is received from the host interface 230 within a given (or alternatively desired or predetermined) time. If the "NOP In" transaction is not received within the given time, then at S440 the storage interface 130 determines that storage device 200 is detached from the host device 100. An attach/detach controller 134 issues an interrupt indicating that the storage device 200 is detached. Based on the interrupt, a processor 110 recognizes that the storage device 200 has been detached; thus, the processor 110 releases a storage space of the storage device 200. The processor 110 may release metadata (e.g., data of a file system) for managing the storage device 200. The processor 110 may release buffer data, cache data, and/or code data that are temporarily stored and are associated with the storage device 200.

Figure 9:
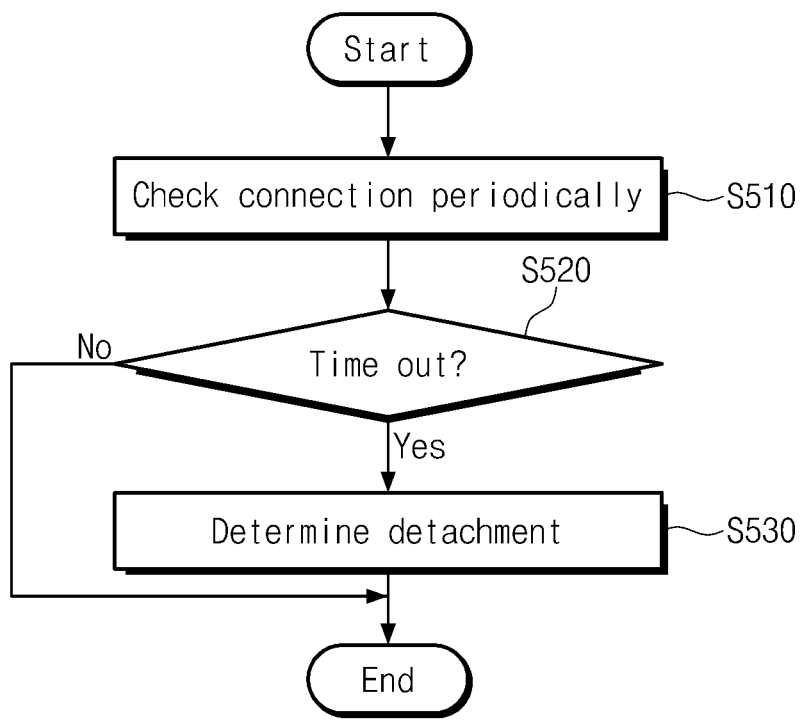
FIG. 9 is a flow chart schematically illustrating operation of a host device according to still another example embodiment of inventive concepts.

FIG. 9 is a flow chart schematically illustrating an operating operation of a host device 100 according to still another example embodiment of inventive concepts. In FIG. 9, there is illustrated an operating method of a storage interface 130 when a storage device 200 is detached from a host device 100.

Referring to FIGS. 1, 2, and 9, at S510 a connection is checked periodically. A storage interface 130 checks a connection with a host interface 230. The storage interface 130 transfers "NOP Out" transaction to the host interface 230 periodically.

At S520, whether or not a timeout occurs is determined. During an operation of checking the connection, the storage interface 130 determines whether or not the timeout occurs. For example, the storage interface 130 determines whether or not "NOP In" transaction, which is defined by the UFS specification, is received from the host interface 230 within a given (or alternatively desired or predetermined) time. If the "NOP In" transaction is not received within the given time, (e.g., when the timeout occurs), then at S530 the storage interface 130 determines that the storage device 200 is detached from the host device 100. An attach/detach controller 134 issues an interrupt indicating that the storage device 200 is detached. Based on the interrupt, a processor 110 recognizes that the storage device 200 has been detached.

As described above, with at least some example embodiments of inventive concepts, there is detected a connection of the storage device 200, which is configured to operate according to the UFS specification, using controls associated with the "HIBERN8" state of the UFS specification. Also, there is detected detachment of the storage device 200, which is configured to operate according to the UFS specification, using "NOP Out" transaction. Thus, without a change of the UFS specification, it is possible to implement hot plug or hot swap of the storage device 200 that is configured to operate according to the UFS specification.

In accordance with example embodiments, UFS devices may be attached, connected to, and accessed by host computer systems without rebooting and/or shutting down the host computer system. For example, memory cards and/or UFS devices may be connected to and accessed by the host computer system without significant interruption to the operation of the host computer system.

Figure 10:
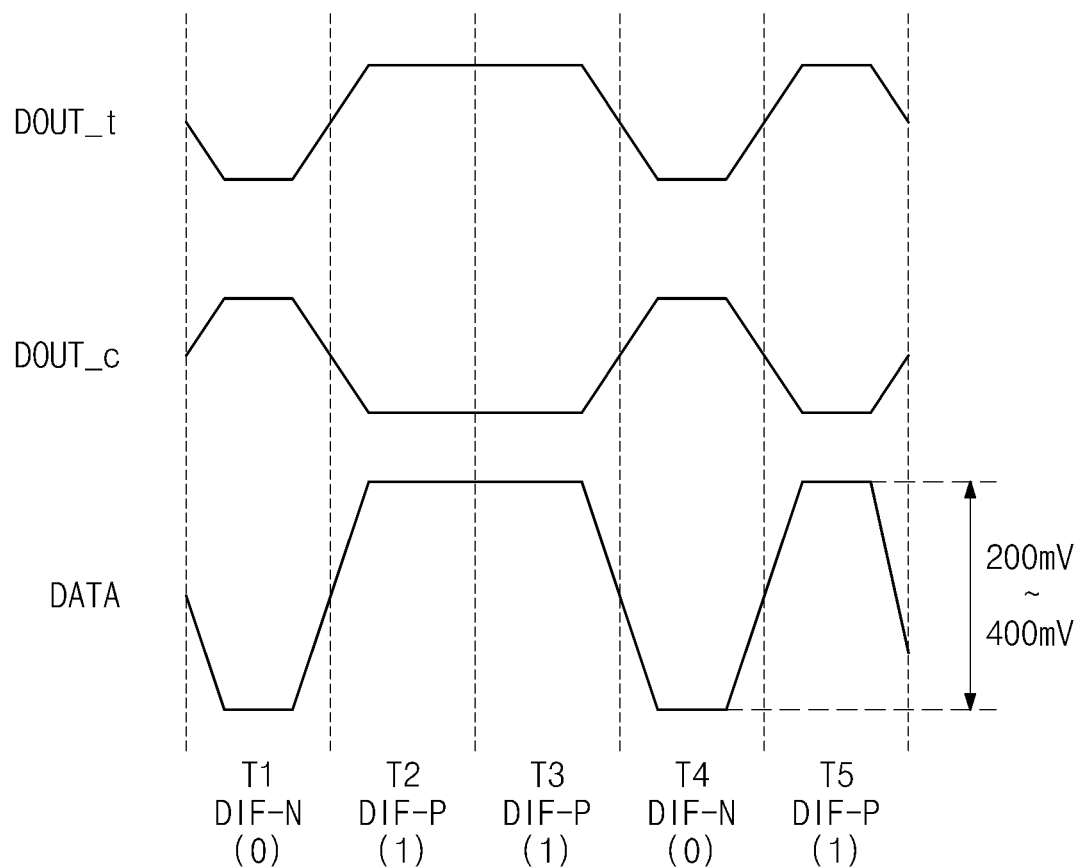
FIG. 10 is a timing diagram schematically illustrating a method where a storage interface or a host interface according to an example embodiment of inventive concepts transmits data.

FIG. 10 is a timing diagram schematically illustrating a method where a storage interface 130 or a host interface 230 according to an example embodiment of inventive concepts transmits data.

Referring to FIGS. 2, 3, and 10, a first output terminal DOUT_t or a second output terminal DOUT_c may transmit data using a negative state DIF-N or a positive state DIF-P.

During a first period T1, the first output terminal DOUT_t and the second output terminal DOUT_c have the negative state DIF-N. The negative state DIF-N may correspond to a digital bit "0".

During a second period T2, the first output terminal DOUT_t and the second output terminal DOUT_c have the positive state DIF-P. The positive state DIF-P may correspond to a digital bit "1".

During a third period T3, the first output terminal DOUT_t and the second output terminal DOUT_c have the positive state DIF-P. The positive state DIF-P may correspond to a digital bit "1".

During a fourth period T4, the first output terminal DOUT_t and the second output terminal DOUT_c have the negative state DIF-N. The negative state DIF-N may correspond to a digital bit "0".

During a fifth period T5, the first output terminal DOUT_t and the second output terminal DOUT_c have the positive state DIF-P. The positive state DIF-P may correspond to a digital bit "1".

In the example embodiment shown in FIG. 10, the first output terminal DOUT_t and the second output terminal DOUT_c transmit a bit stream of "01101" using the negative state DIF-N and the positive state DIF-P.

In at least some example embodiments, a voltage difference between the positive state DIF-P and the negative state DIF-N may range from about 200 mV to about 400 mV, inclusive. That is, for example, a swing width of a signal to be transferred as data may range from about 200 mV to about 400 mV, inclusive.

Figure 11:
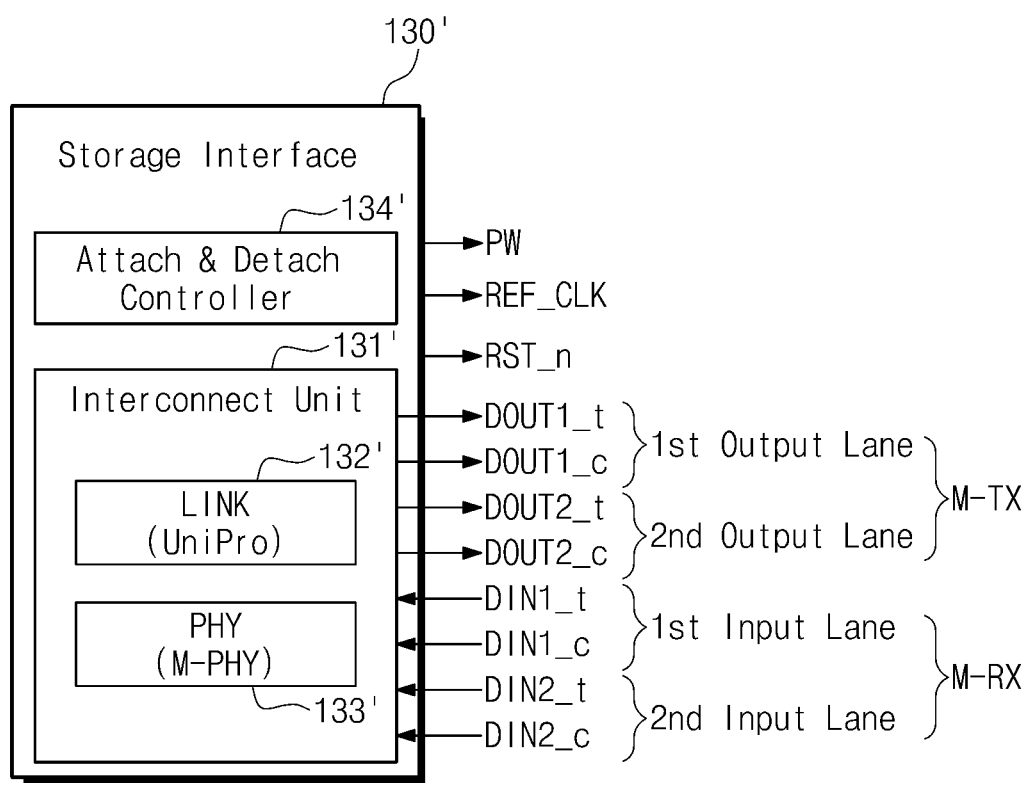
FIG. 11 is a block diagram schematically illustrating a storage interface according to another example embodiment of inventive concepts.

FIG. 11 is a block diagram schematically illustrating a storage interface 130' according to another example embodiment of inventive concepts.

Referring to FIG. 11, the storage interface 130' contains an interconnect unit 131' and an attach/detach controller 134'. The interconnect unit 131' has a link layer portion 132' and a physical layer portion 133'.

As compared with a storage interface 130 described with reference to FIG. 2, a transmission channel M-TX of the storage interface 130' includes a plurality of output lanes. Each output lane may include a first output terminal DOUT_t and a second output terminal DOUT_c. That is, for example, the storage interface 130' transmits signals through two output lanes.

Also, a reception channel M-RX of the storage interface 130' includes a plurality of input lanes. Each input lane may include a first input terminal DIN_t and a second input terminal DIN_c. That is, for example, the storage interface 130' receives signals through two input lanes. An attach/detach controller 134 detects a connection of a storage device 200, according to whether a non-squelch state is detected from one or more input lanes.

In at least some example embodiments, the number of output lanes or the number of input lanes of the storage interface 130' is not limited to one or two. For example, the number of output lanes or the number of input lanes of the storage interface 130' may be three or more.

Figure 12:
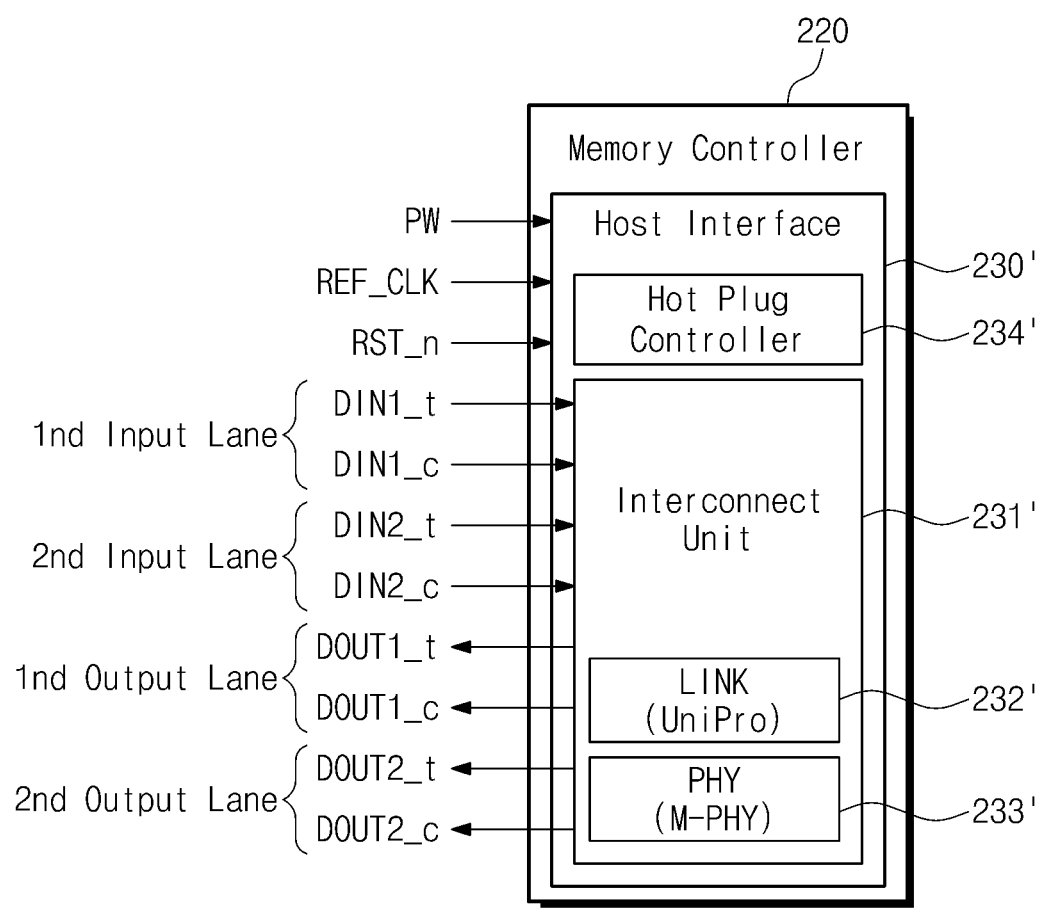
FIG. 12 is a block diagram schematically illustrating a host interface according to another example embodiment of inventive concepts.

FIG. 12 is a block diagram schematically illustrating a host interface 230' according to another example embodiment of inventive concepts. Referring to FIG. 12, the host interface 230' includes an interconnect unit 231' and a hot plug controller 234'. The interconnect unit 231' contains a link layer portion 232' and a physical layer portion 233'.

As compared with a host interface 230 described with reference to FIG. 3, a transmission channel M-TX of the host interface 230' contains a plurality of output lanes, each of which includes a first output terminal DOUT_t and a second output terminal DOUT_c. That is, for example, the host interface 230' transmits signals via two or more output lanes. After a power-on reset operation is ended, the hot plug controller 234' controls the interconnect unit 231' such that one or more output lanes drive a negative state DIF-N.

Also, a reception channel M-RX of the host interface 230' has a plurality of input lanes, each of which contains a first input terminal DIN_t and a second input terminal DIN_c. That is, for example, the host interface 230' receives signals via two or more input lanes.

Figure 13:
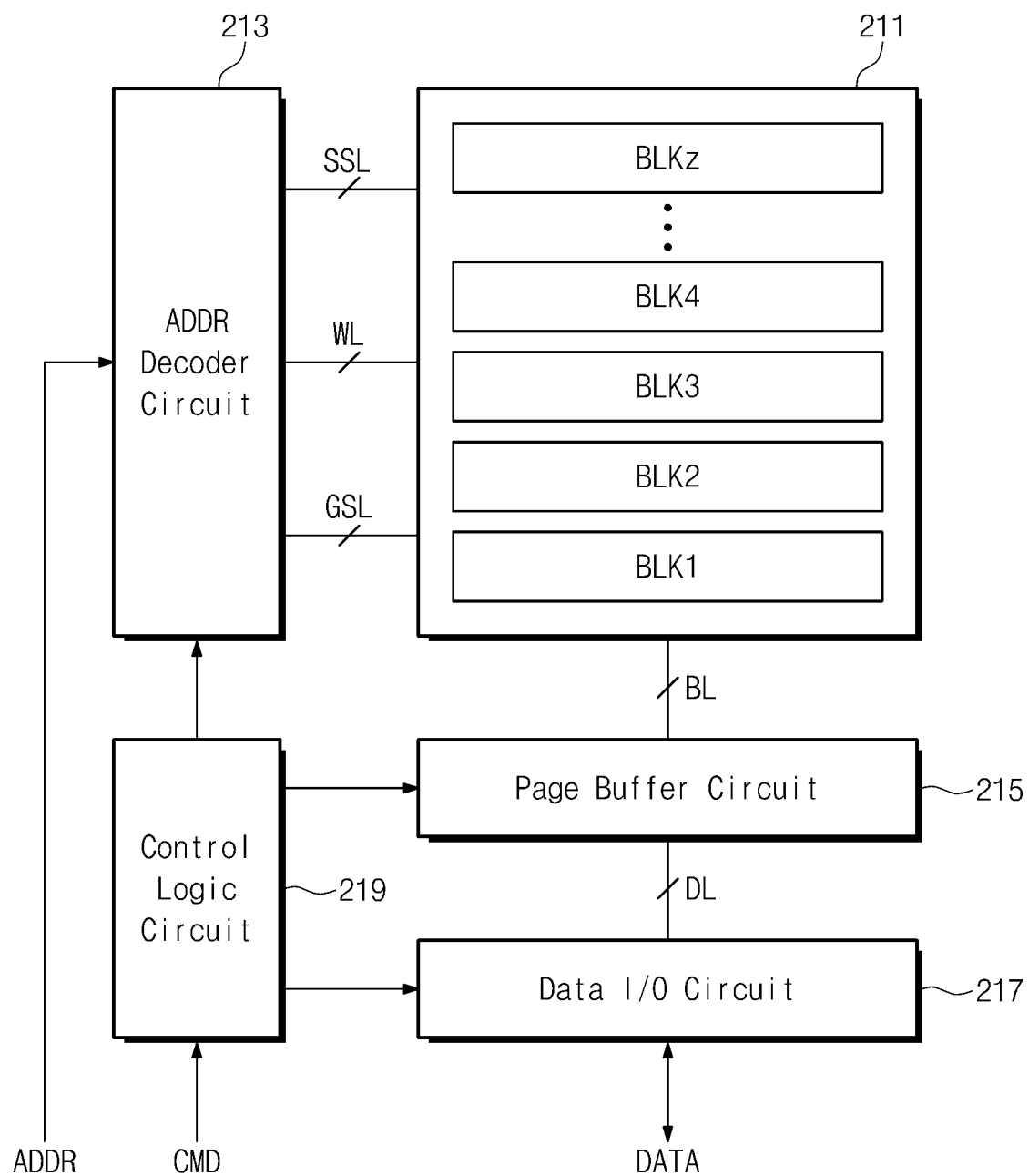
FIG. 13 is a block diagram schematically illustrating a nonvolatile memory of a storage device shown in FIG. 3, according to an example embodiment of inventive concepts.

FIG. 13 is a block diagram schematically illustrating a nonvolatile memory 210 of a storage device 200 shown in FIG. 3, according to an example embodiment of inventive concepts.

Referring to FIG. 13, a nonvolatile memory 210 includes: a memory cell array 211; an address decoder circuit 213; a page buffer circuit 215; a data input/output circuit 217; and a control logic circuit 219.

The memory cell array 211 includes a plurality of memory blocks BLK1 to BLKz, each of which includes a plurality of memory cells. Each memory block is connected to the address decoder circuit 213 through at least one ground selection line SSL, a plurality of word lines WL, and at least one ground selection line GSL. The memory cell array 211 is connected to the page buffer circuit 215 through a plurality of bit lines BL. The memory blocks BLK1 to BLKz may be connected in common to the plurality of bit lines BL. Memory cells of the memory blocks BLK1 to BLKz may have the same or substantially the same structure.

The address decoder circuit 213 is connected to the memory cell array 211 through a plurality of ground selection lines GSL, the plurality of word lines WL, and a plurality of string selection lines SSL. The address decoder circuit 213 operates according to control of the control logic circuit 219. The address decoder circuit 213 receives an address from a memory controller 220 (refer to FIG. 3). The address decoder circuit 213 decodes an input address ADDR and controls voltages to be applied to the word lines WL according to the decoded address. For example, during a program operation, the address decoder circuit 213 applies a pass voltage to the word lines WL according to control of the control logic circuit 219. During the program operation, the address decoder circuit 213 further applies a program voltage to a wordline WL corresponding to the input address ADDR from among the word lines WL according to control of the control logic circuit 219.

The page buffer circuit 215 is connected to the memory cell array 211 through the bit lines BL. The page buffer circuit 215 is connected to the data input/output circuit 217 through a plurality of data lines DL. The page buffer circuit 215 operates according to control of the control logic circuit 219.

The page buffer circuit 215 stores data to be programmed at, or data read from, memory cells of the memory cell array 211. During a program operation, the page buffer circuit 215 stores data to be stored in memory cells. Based on the stored data, the page buffer circuit 215 biases the plurality of bit lines BL. The page buffer circuit 215 functions as a write driver for a program operation. During a read operation, the page buffer circuit 215 senses voltages on the bit lines BL and stores sensing results. The page buffer circuit 215 functions as a sense amplifier for a read operation.

The data input/output circuit 217 is connected to the page buffer circuit 215 through the data lines DL. The data input/output circuit 217 exchanges data with the memory controller 220.

The data input/output circuit 217 temporarily stores data received from the memory controller 220. The data input/output circuit 217 transfers the stored data to the page buffer circuit 215. The data input/output circuit 217 temporarily stores data transferred from the page buffer circuit 215. The data input/output circuit 217 transfers the stored data to the memory controller 220. The data input/output circuit 217 functions as a buffer memory.

The control logic circuit 219 receives a command CMD from the memory controller 220. The control logic circuit 219 decodes the received command and controls an overall operation of the nonvolatile memory 210 according to the decoded command. The control logic circuit 219 further receives a variety of control signals and voltages from the memory controller 220.

Figure 14:
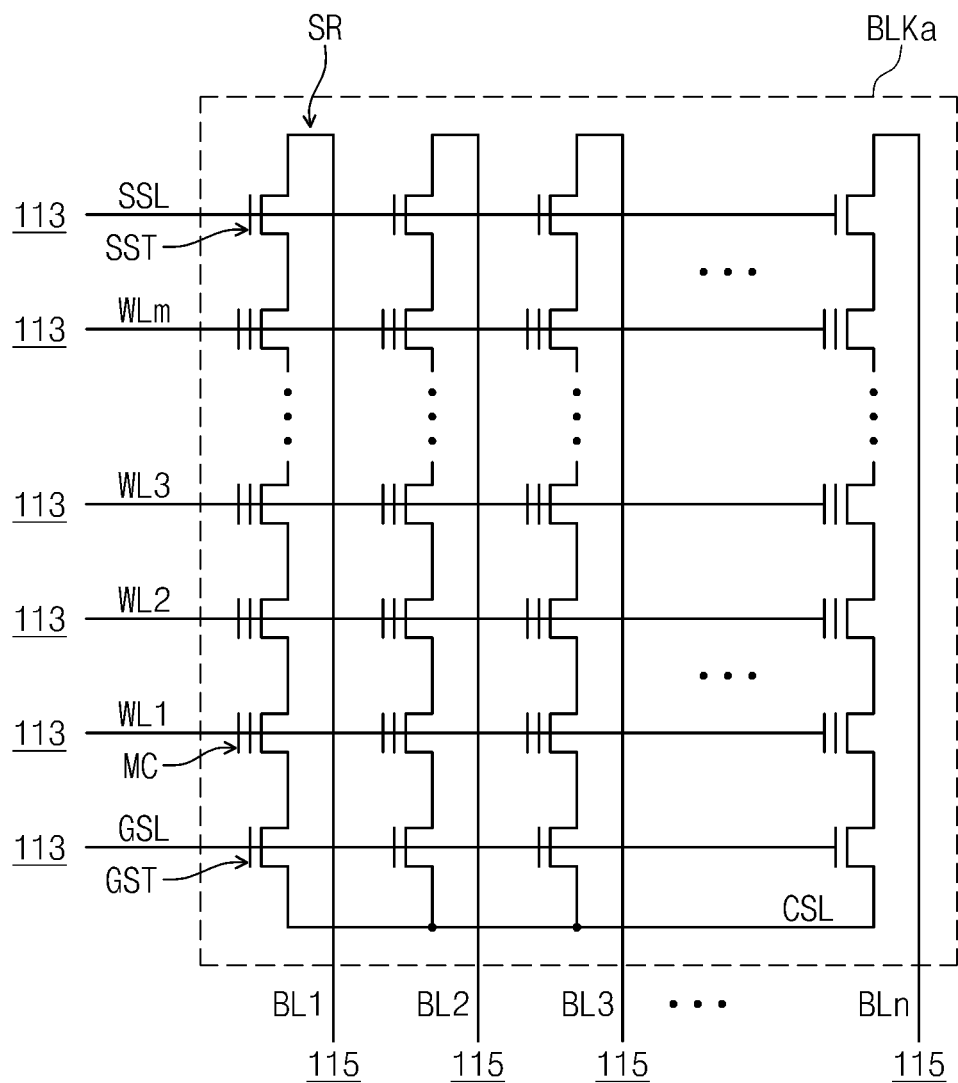
FIG. 14 is a circuit diagram schematically illustrating a memory block of a nonvolatile memory shown in FIG. 13, according to an example embodiment of inventive concepts.

FIG. 14 is a circuit diagram schematically illustrating a memory block BLKa of a nonvolatile memory 210 shown in FIG. 13, according to an example embodiment of inventive concepts. FIG. 14 illustrates one BLKa of a plurality of memory blocks BLK1 to BLKz of a memory cell array 211 shown in FIG. 13.

Referring to FIGS. 13 and 14, a memory block BLKa includes a plurality of strings SR, which are connected to a plurality of bit lines BL1 to BLn, respectively. Each string SR includes: a ground selection transistor GST; memory cells MC; and a string selection transistor SST.

In each string SR, the ground selection transistor GST is connected between the memory cells MC and a common source line CSL, and the ground selection transistors GST of the string SR are connected in common to the common source line CSL.

In each string SR, the string selection transistor SST is connected between the memory cells MC and a bit line BL, and the string selection transistors SST of the string SR are connected to a plurality of bit lines BL1 to BLn, respectively. The bit lines BL1 to BLn may be connected to a page buffer circuit 115.

In each string SR, the plurality of memory cells MC are connected between the ground selection transistor GST and the string selection transistor SST. In each string SR, the plurality of memory cells MC are connected in series.

In the strings SR, memory cells MC having the same height or distance from the common source line CSL are connected in common to a word line. The memory cells MC of the strings SR are connected to a plurality of word lines WL1 to WLm. The word lines WL1 to WLm may be connected to an address decoder circuit 213.

Figure 15:
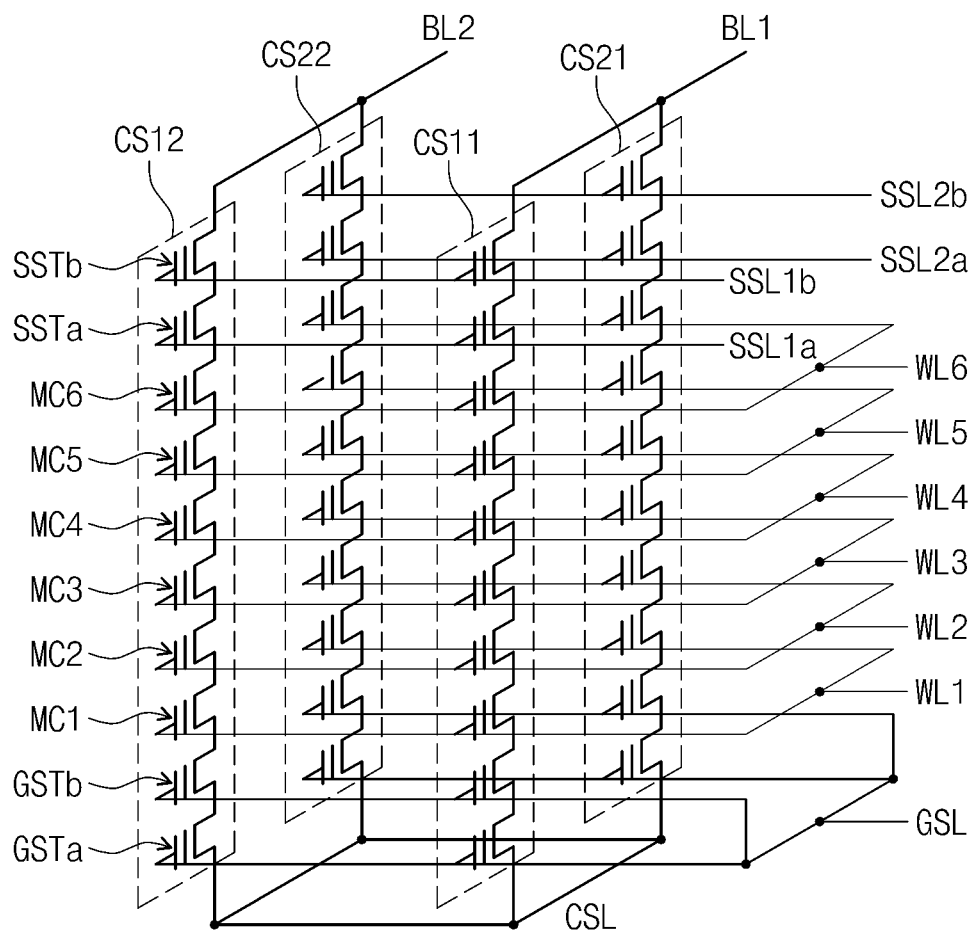
FIG. 15 is a circuit diagram schematically illustrating a memory block of a nonvolatile memory shown in FIG. 13, according to another example embodiment of inventive concepts.
Figure 15:
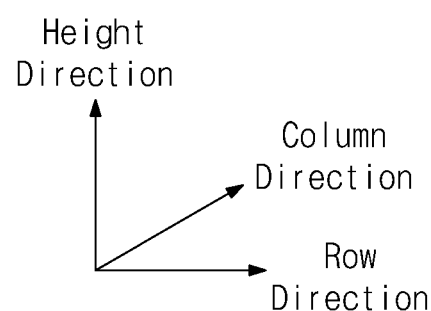

FIG. 15 is a circuit diagram schematically illustrating a memory block BLKb of a nonvolatile memory 210 shown in FIG. 13, according to another example embodiment of inventive concepts.

Referring to FIG. 15, the memory block BLKb includes a plurality of cell strings CS11 to CS21 and CS12 to CS22. The plurality of cell strings CS11 to CS21 and CS12 to CS22 are arranged along a row direction and a column direction and form rows and columns.

For example, the cell strings CS11 and CS12 arranged along the row direction form a first row, and the cell strings CS21 and CS22 arranged along the row direction form a second row. The cell strings CS11 and CS21 arranged along the column direction form a first column, and the cell strings CS12 and CS22 arranged along the column direction form a second column.

Each cell string includes a plurality of cell transistors, which include ground selection transistors GSTa and GSTb, memory cells MC1 to MC6, and string selection transistors SSTa and SSTb. The ground selection transistors GSTa and GSTb, memory cells MC1 to MC6, and string selection transistors SSTa and SSTb of each cell string are stacked in a height direction perpendicular or substantially perpendicular to a plane (e.g., a plane above a substrate of the memory block BLKb) on which the cell strings CS11 to CS21 and CS12 to CS22 are arranged along rows and columns.

Lowermost ground selection transistors GSTa are connected in common to a common source line CSL.

The ground selection transistors GSTa and GSTb of the plurality of cell strings CS11 to CS21 and CS12 to CS22 are connected in common to a ground selection line GSL.

In at least some example embodiments, ground selection transistors with the same height (or order) may be connected to the same ground selection line, and ground selection transistors with different heights (or orders) may be connected to different ground selection lines. For example, the ground selection transistors GSTa with a first height are connected in common to a first ground selection line, and the ground selection transistors GSTb with a second height are connected in common to a second ground selection line.

In at least some example embodiments, ground selection transistors in the same row may be connected to the same ground selection line, and ground selection transistors in different rows may be connected to different ground selection lines. For example, the ground selection transistors GSTa and GSTb of the cell strings CS11 and CS12 in the first row are connected in common to the first ground selection line, and the ground selection transistors GSTa and GSTb of the cell strings CS21 and CS22 in the second row are connected in common to the second ground selection line.

Memory cells that are placed at the same height (or order) from the substrate (or the ground selection transistors GST) are connected in common to a word line. Memory cells that are placed at different heights (or orders) are connected to different word lines WL1 to WL6. For example, the memory cells MC1 are connected in common to the word line WL1, the memory cells MC2 are connected in common to the word line WL2, and the memory cells MC3 are connected in common to the word line WL3. The memory cells MC4 are connected in common to the word line WL4, the memory cells MC5 are connected in common to the word line WL5, and the memory cells MC6 are connected in common to the word line WL6.

Among the first string selection transistors SSTa, having the same height (or order), of the cell strings CS11 to CS21 and CS12 to CS22, the first string selection transistors SSTa in different rows are connected to different string selection lines SSL1a and SSL2a. For example, the first string selection transistors SSTa of the cell strings CS11 and CS12 are connected in common to the string selection line SSL1a, and the first string selection transistors SSTa of the cell strings CS21 and CS22 are connected in common to the string selection line SSL2a.

Among the second string selection transistors SSTb, having the same height (or order), of the cell strings CS11 to CS21 and CS12 to CS22, the second string selection transistors SSTb in different rows are connected to the different string selection lines SSL1a and SSL2a. For example, the second string selection transistors SSTb of the cell strings CS11 and CS12 are connected in common to the string selection line SSL1*b*, and the second string selection transistors SSTb of the cell strings CS21 and CS22 are connected in common to the string selection line SSL2*b*.

That is, for example, cell strings in different rows may be connected to different strings selection lines. String selection transistors, having the same height (or order), of cell strings in the same row are connected to the same string selection line. String selection transistors, having different heights (or orders), of cell strings in the same row are connected to different string selection lines.

In at least some example embodiments, string selection transistors of cell strings in the same row are connected in common to a string selection line. For example, string selection transistors SSTa and SSTb of cell strings CS11 and CS12 in the first row are connected in common to a string selection line, and string selection transistors SSTa and SSTb of cell strings CS21 and CS22 in the second row are connected in common to a string selection line.

Columns of the cell strings CS11 to CS21 and CS12 to CS22 are connected to different bit lines BL1 and BL2, respectively. For example, string selection transistors SSTb of the cell strings CS11 and CS21 in the first column are connected in common to the bit line BL1, and string selection transistors SSTb of the cell strings CS12 and CS22 in the second column are connected in common to the bit line BL2.

The memory block BLKb shown in FIG. 15 is only an example, and inventive concepts are not limited thereto. For example, the number of rows of cell strings may increase or decrease. As the number of rows of cell strings is changed, the number of string or ground selection lines and the number of cell strings connected to a bit line may also be changed.

The number of columns of cell strings may increase or decrease. As the number of columns of cell strings is changed, the number of bit lines connected to columns of cell strings and the number of cell strings connected to a string selection line may also be changed.

A height of the cell strings may increase or decrease. For example, the number of ground selection transistors, memory cells, and/or string selection transistors that are stacked in each cell string may increase or decrease.

In at least some example embodiments, a write and a read operation may be performed by a row unit. For example, the cell strings CS11 to CS21 and CS12 to CS22 may be selected by a row unit through the string selection lines SSL1*a*, SSL1*b*, SSL2*a*, and SSL2*b*.

In a selected row of cell strings CS11 to CS21 and CS12 to CS22, a write or a read operation may be performed by a word line unit. In a selected row of cell strings CS11 to CS21 and CS12 to CS22, memory cells connected to a selected word line may be programmed.

Figure 16:
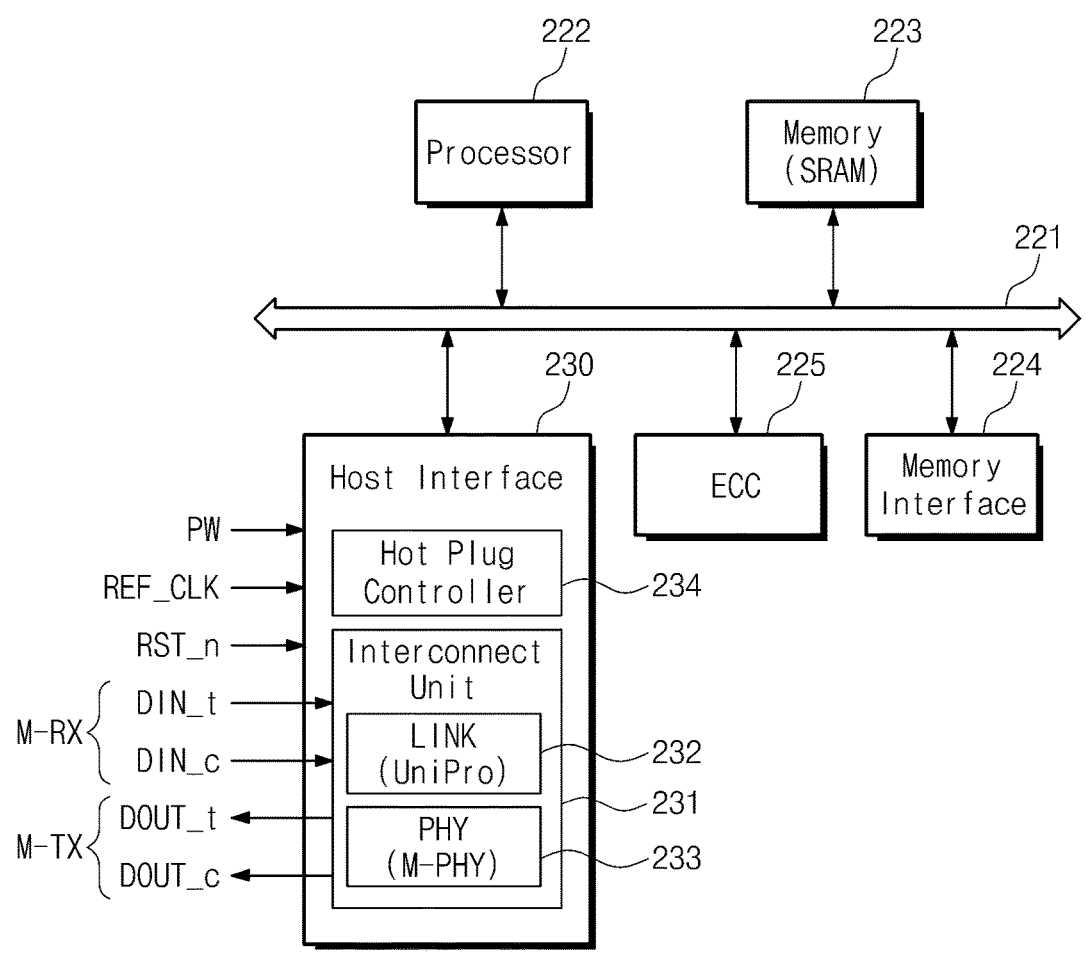
FIG. 16 is a block diagram schematically illustrating a memory controller according to an example embodiment of inventive concepts.

FIG. 16 is a block diagram schematically illustrating a memory controller 220 according to an example embodiment of inventive concepts.

Referring to FIG. 16, the memory controller 220 includes: a bus 221; a processor 222; a memory 223; a memory interface 224; an ECC block 225; and a host interface 230.

The bus 221 may be configured to provide a channel between components of the memory controller 220.

The processor 222 controls an overall operation of the memory controller 220 and performs logical operations. The processor 222 communicates with an external host device 100 (refer to FIG. 1) through the host interface 230. The processor 222 communicates with an external nonvolatile memory 210 (refer to FIG. 3) through the memory interface 224. The processor 222 may be a microcontroller.

The memory 223 may be used as a working memory, a cache memory, or a buffer memory of the processor 222. The memory 223 stores codes or instructions that the processor 222 executes. The memory 223 stores data processed by the processor 222. The memory 223 may include an SRAM, but example embodiments are not limited to this example.

The memory interface 224 communicates with the nonvolatile memory 210 according to control of the processor 222.

The ECC block 225 performs error correction. The ECC block 225 generates parity bits and/or codes for error correction based on data to be written at the nonvolatile memory 210. The nonvolatile memory 210 stores data and parity bits/codes sent through the memory interface 224. The ECC block 225 corrects errors in data using data and parity bits/codes read from the nonvolatile memory 210 through the memory interface 224.

The host interface 230 communicates with the external host device 100 according to a control of the processor 222. The host interface 230 may include a host interface described above with reference to FIG. 3. That is, for example, the host interface 230 supports hot plug or hot swap.

Figure 17:
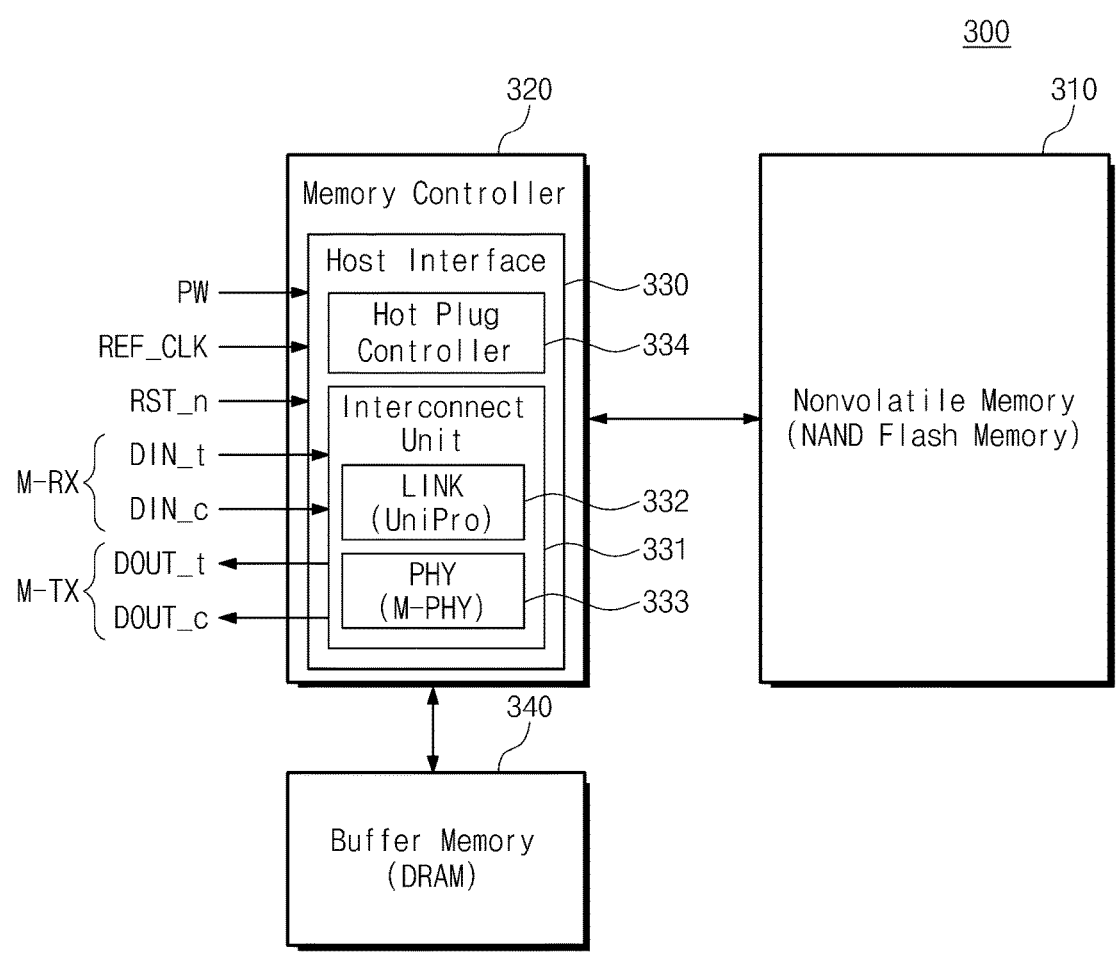
FIG. 17 is a block diagram schematically illustrating a storage device according to another example embodiment of inventive concepts.

FIG. 17 is a block diagram schematically illustrating a storage device 300 according to another example embodiment of inventive concepts.

Referring to FIG. 17, the storage device 300 includes: a nonvolatile memory 310; a memory controller 320; and a buffer memory 340. The memory controller 320 includes a host interface 330. The host interface 330 includes an interconnect unit 331 and a hot plug controller 334. The interconnect unit 331 includes a link layer portion 332 and a physical layer portion 333.

As compared with the storage device 200 described with reference to FIG. 3, the storage device 300 further includes the buffer memory 340. The buffer memory 340 stores data to be written to, or read from, the nonvolatile memory 310, according to control of the memory controller 320. The buffer memory 340 may include a DRAM, but example embodiments are not limited to this example.

Figure 18:
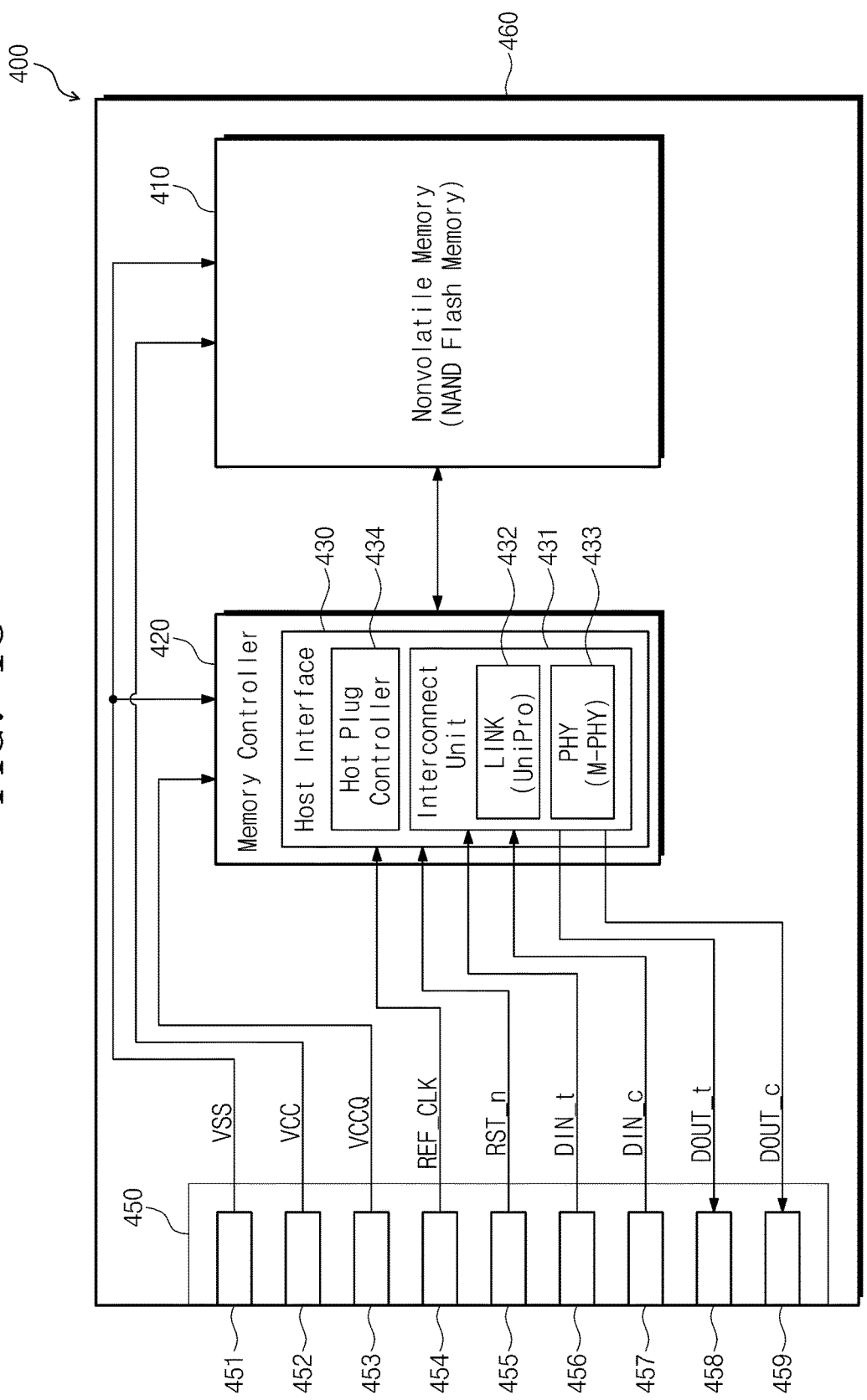
FIG. 18 is a block diagram schematically illustrating schematically illustrating a memory card according to an example embodiment of inventive concepts.

FIG. 18 is a block diagram schematically illustrating a memory card 400 according to an example embodiment of inventive concepts.

Referring to FIG. 18, a memory card 400 includes: a nonvolatile memory 410; a memory controller 420; a connector 450; and a body 460. The memory controller 420 includes a host interface 430. The host interface 430 includes an interconnect unit 431 and a hot plug controller 434. The interconnect unit 431 has a link layer portion 432 and a physical layer portion 433. The host interface 430 may support hot plug or hot swap.

The connector 450 is configured to be attached to and detached from an external host device 100 (refer to FIG. 1). The connector 450 has a plurality of connection terminals 451 to 459. A first connection terminal 451 is supplied with a ground voltage VSS from the external host device 100. The first connection terminal 451 supplies the nonvolatile memory 410 and the memory controller 420 with the ground voltage VSS from the external host device 100.

A second connection terminal 452 is supplied with a first power supply voltage VCC from the external host device 100. The second connection terminal 452 provides the nonvolatile memory 410 with the first power supply voltage VCC from the external host device 100.

A third connection terminal 453 is supplied with a second power supply voltage VCCQ from the external host device 100. The third connection terminal 453 provides the memory controller 420 with the second power supply voltage VCCQ from the external host device 100.

A fourth connection terminal 454 provides a clock terminal REF_CLK of the memory controller 420 with a clock from the external host device 100. A fifth connection terminal 455 provides a reset terminal RST_n of the memory controller 420 with a reset signal from the external host device 100. Sixth and seventh connection terminals 456 and 457 transmit signals from the external host device 100 to first and second input terminals DIN_t and DIN_c of the memory controller 420. Eighth and ninth connection terminals 458 and 459 transfer to the external host device 100 signals transferred from first and second output terminals DOUT_t and DOUT_c of the memory controller 420.

The body 460 surrounds components of the memory card 4000 to protect the memory card 400 physically.

While inventive concepts have been described with reference to example embodiments, it will be apparent to those skilled in the art that various changes and modifications may be made without departing from the spirit and scope of inventive concepts. Therefore, it should be understood that the above example embodiments are not limiting, but illustrative.

What is claimed is:

1. A memory card comprising:
   a first signal terminal configured to output a first signal to an external device;
   a second signal terminal configured to output a second signal to the external device, the first signal complementary to the second signal; and
   a controller configured to drive the first and second signal terminals to have a first negative state until a link connection is performed after power is supplied to the memory card; wherein
      when a level of the first signal is greater than a level of the second signal, the first and second signal terminals are in a positive state, and
      when the level of the first signal is smaller than the level of the second signal, the first and second signal terminals are in the first negative state.

2. The memory card of claim 1, further comprising:
   a third signal terminal configured to receive a third signal;
   a fourth signal terminal configured to receive a fourth signal, the third and fourth signals being complementary to each other; and wherein
   the controller is configured to drive the third and fourth signal terminals to a ground level when the power is supplied to the memory card.

3. The memory card of claim 2, wherein the controller is configured to detect a second negative state when a level of the third signal is smaller than a level of the fourth signal.

4. The memory card of claim 3, wherein:
   when the second negative state is detected, the controller is configured to perform the link connection using the first to fourth signal terminals.

5. The memory card of claim 1, wherein:
   the positive state corresponds to a first bit, and the first negative state corresponds to a second bit; and
   the controller is configured to transmit data through the first and second signal terminals when performing the link connection.

6. The memory card of claim 5, wherein the controller is configured to transmit the data using the positive state and the first negative state.

7. The memory card of claim 1, wherein the controller is configured to notify the external device that the memory card is connected to the external device by driving the first and second signal terminals to have the first negative state.

8. The memory card of claim 1, wherein the controller is configured to drive the first and second signal terminals to the first negative state after a power-on reset operation is performed.

9. The memory card of claim 1, wherein, in the first negative state, a voltage difference between the second signal and the first signal has a range from about 200 mV to about 400 mV, inclusive.

10. An interface circuit configured to communicate with a memory card, the interface circuit comprising:
    a first signal terminal configured to receive a first signal from the memory card;
    a second signal terminal configured to receive a second signal from the memory card, the first and second signals being complementary to each other; and
    a controller configured to detect whether or not the memory card is connected based on the first and second signals received through the first and second signal terminals, the controller being further configured to drive the first and second signal terminals to have a ground state when the memory card is not connected.

11. The interface circuit of claim 10, wherein:
    the first and second signal terminals have a positive state when a level of the first signal is greater than a level of the second signal;
    the first and second signal terminals have a negative state when the level of the first signal is smaller than the level of the second signal; and
    the controller is configured to detect that the memory card is attached when the first and second signal terminals have the negative state.

12. The interface circuit of claim 10, further comprising:
    a third signal terminal configured to output a third signal;
    a fourth signal terminal configured to output a fourth signal, the third and fourth signals being complementary to each other; and wherein
    the controller is configured to set the third and fourth signal terminals to a power saving mode when the memory card is not connected.

13. The interface circuit of claim 12, wherein the controller is configured to drive the third and fourth signal terminals to have a negative state if the controller detects that the memory card is connected, the negative state being a state in which a level of the third signal is smaller than a level of the fourth signal.

14. The interface circuit of claim 13, wherein the controller is configured to perform a link connection with the memory card through the first to fourth signal terminals after the third and fourth signal terminals are driven to have the negative state.

15. The interface circuit of claim 10, wherein the controller is further configured to,
    check a connection with the memory card, and
    detect that the memory card is disconnected if the connection check fails.

16. The interface circuit of claim 15, wherein the controller is further configured to check the connection in response to a communication error with the memory card.

17. The interface circuit of claim 15, wherein the controller is further configured to check the connection periodically.

18. A memory card comprising:
- a first output terminal configured to output a first output signal to an external device;
- a second output terminal configured to output a second output signal to the external device, the first and second output signals being complementary to each other;
- a first input terminal configured to receive a first input signal from the external device;
- a second input terminal configured to receive a second input signal from the external device, the first and second input signals being complementary to each other;
- a controller configured to, upon supply of power from the external device, drive the first and second output terminals such that a level of the first output signal is smaller than a level of the second output signal, and drive the first and second input terminals to a ground level; and
- a nonvolatile memory configured to operate according to control of the controller.

19. The memory card of claim 18, wherein the controller is further configured to perform a link connection with the external device in response to detecting, through the first and second input terminals, that a level of the first input signal is smaller than a level of the second input signal.

20. The memory card of claim 19, wherein the memory card is a detachable portable storage.

* * * * *